(12) United States Patent
Hayden et al.

(10) Patent No.: US 12,169,078 B2
(45) Date of Patent: Dec. 17, 2024

(54) MODULAR HEATING SYSTEM

(71) Applicant: EEMAX, INC., Waterbury, CT (US)

(72) Inventors: Chris Hayden, Shelton, CT (US); Eric Jurczyszak, Berlin, CT (US); Jeff Hankins, Southbury, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 510 days.

(21) Appl. No.: 16/247,640

(22) Filed: Jan. 15, 2019

(65) Prior Publication Data

US 2019/0145656 A1   May 16, 2019

Related U.S. Application Data

(63) Continuation of application No. 13/943,495, filed on Jul. 16, 2013, now Pat. No. 10,222,091.

(60) Provisional application No. 61/740,653, filed on Dec. 21, 2012, provisional application No. 61/672,336, filed on Jul. 17, 2012.

(51) Int. Cl.
*F24H 1/10* (2022.01)
*B23P 19/00* (2006.01)
*F24H 9/1818* (2022.01)
*F24H 9/20* (2022.01)

(52) U.S. Cl.
CPC .............. *F24H 1/102* (2013.01); *B23P 19/00* (2013.01); *F24H 1/103* (2013.01); *F24H 9/1818* (2013.01); *F24H 9/2028* (2013.01); *Y10T 29/49826* (2015.01)

(58) Field of Classification Search
CPC ..... H05B 3/0095; D02J 13/005; B29C 33/044
USPC .......... 219/528; 122/4 R, 4 A, 4 C, 4 D, 40; 392/311, 324, 333, 336, 337, 480–491
See application file for complete search history.

(56) References Cited

U.S. PATENT DOCUMENTS 270,478 A   1/1883   Pumphrey
601,585 A   3/1898   McElroy
(Continued)

FOREIGN PATENT DOCUMENTS

CN   201844531 U   5/2011
CN   102200346 A   9/2011
(Continued)

OTHER PUBLICATIONS

CNIPO, "Office Action" Application No. 21380046720.5 issued May 19, 2016.
(Continued)

*Primary Examiner* — Nathaniel E Wiehe
*Assistant Examiner* — Thomas J Ward
(74) *Attorney, Agent, or Firm* — Eversheds Sutherland (US) LLP

(57) ABSTRACT

A heating unit for heating fluid is described having a first manifold having at least one inlet, a second manifold connected to the first manifold and having at least one outlet, and a third manifold. The heating unit also includes one or more heating systems which extend from the third manifold to the first manifold via the second manifold, where the one or more heating systems have an inner tube and an outer tube. Further, the heating unit includes a fluid flow path from the at least one inlet to the at least one outlet via the first manifold, an area between the inner tube and outer tube, the interior of the inner tube and the second manifold.

17 Claims, 15 Drawing Sheets

(56) References Cited

U.S. PATENT DOCUMENTS

| | | | |
|---|---|---|---|
| 1,718,970 A * | 7/1929 | Lonergan | F24H 1/102 122/18.1 |
| 1,729,483 A | 9/1929 | Koch | |
| 1,777,744 A | 10/1930 | Breuer | |
| 1,821,525 A | 9/1931 | Nielsen | |
| 1,851,851 A | 3/1932 | Lee et al. | |
| 2,032,416 A | 3/1936 | Hunt | |
| 2,041,687 A | 5/1936 | Benson | |
| 2,224,422 A | 12/1940 | Ballman | |
| 2,360,019 A | 10/1944 | Ryan | |
| 2,576,298 A | 11/1951 | Horsley et al. | |
| 2,589,566 A | 3/1952 | Neth et al. | |
| 2,681,409 A | 6/1954 | Dobbins | |
| 2,730,609 A | 1/1956 | Constantinesco | |
| 2,824,199 A | 2/1958 | Browne | |
| 2,996,316 A | 8/1961 | Terhune | |
| 3,088,017 A | 4/1963 | Schomann | |
| 3,108,174 A | 10/1963 | Hynes | |
| 3,310,769 A | 3/1967 | Simmons | |
| 3,313,921 A | 4/1967 | Mohn et al. | |
| 3,329,455 A | 7/1967 | Becker et al. | |
| 3,512,114 A | 5/1970 | Dzaack | |
| 3,625,549 A | 12/1971 | De Vries | |
| 3,633,748 A | 1/1972 | Hanley et al. | |
| 3,921,505 A | 11/1975 | Wunsch | |
| 3,977,073 A | 8/1976 | Shirey | |
| 4,056,143 A | 11/1977 | Martin | |
| 4,142,515 A | 3/1979 | Skaats | |
| 4,185,187 A * | 1/1980 | Rogers | F24H 9/2014 392/471 |
| 4,242,775 A | 1/1981 | Eickmann | |
| 4,250,399 A | 2/1981 | King | |
| 4,270,367 A | 6/1981 | Santore | |
| 4,338,888 A | 7/1982 | Gerstmann et al. | |
| 4,439,669 A | 3/1984 | Ryffel | |
| 4,460,201 A | 7/1984 | McGugan | |
| 4,600,334 A | 7/1986 | Soussloff | |
| 4,682,578 A | 7/1987 | Schmidt | |
| 4,762,980 A | 8/1988 | Insley | |
| 4,775,258 A | 10/1988 | Lange | |
| 4,808,793 A | 2/1989 | Hurko | |
| 4,813,992 A | 3/1989 | Hale | |
| 4,835,365 A | 5/1989 | Etheridge | |
| 4,885,840 A | 12/1989 | McManus | |
| 4,892,432 A | 1/1990 | Cooper | |
| 5,054,108 A | 10/1991 | Gustin et al. | |
| 5,122,640 A | 6/1992 | Holmes | |
| 5,124,534 A | 6/1992 | Williams et al. | |
| RE34,018 E | 8/1992 | Petersen et al. | |
| 5,216,743 A | 6/1993 | Seltz | |
| 5,243,185 A | 9/1993 | Blackwood | |
| 5,269,572 A | 12/1993 | Mefferd | |
| 5,293,446 A | 3/1994 | Owens et al. | |
| 5,308,207 A | 5/1994 | Jaskowiak | |
| 5,325,822 A | 7/1994 | Fernandez | |
| 5,384,032 A | 1/1995 | de Souza | |
| 5,400,432 A | 3/1995 | Kager et al. | |
| 5,408,575 A | 4/1995 | Morris | |
| 5,549,078 A | 8/1996 | Annecharico et al. | |
| 5,559,924 A | 9/1996 | Kadotani et al. | |
| 5,628,895 A | 5/1997 | Zucholl | |
| 5,740,315 A | 4/1998 | Onishi et al. | |
| 5,772,355 A | 6/1998 | Ross et al. | |
| 5,897,269 A | 4/1999 | Ross et al. | |
| 5,930,458 A | 7/1999 | Yane et al. | |
| 5,959,254 A | 9/1999 | Martin, Sr. | |
| 5,995,711 A | 11/1999 | Fukuoka et al. | |
| 6,005,225 A | 12/1999 | Kowalski et al. | |
| 6,020,577 A | 2/2000 | Barker | |
| 6,055,360 A | 4/2000 | Inoue et al. | |
| 6,091,890 A | 7/2000 | Gruzdev et al. | |
| 6,097,007 A | 8/2000 | Wang | |
| 6,157,778 A | 12/2000 | Kadotani | |
| 6,199,515 B1 | 3/2001 | Clarke | |
| 6,231,194 B1 | 5/2001 | Raj et al. | |
| 6,236,810 B1 | 5/2001 | Kadotani | |
| 6,240,250 B1 | 5/2001 | Blanco, Jr. | |
| 6,246,831 B1 | 6/2001 | Seitz et al. | |
| 6,252,220 B1 | 6/2001 | Jedlicka et al. | |
| 6,259,070 B1 | 7/2001 | Audet | |
| 6,297,740 B1 | 10/2001 | Hill et al. | |
| 6,345,769 B2 | 2/2002 | Macintyre | |
| 6,509,554 B2 | 1/2003 | Howard et al. | |
| 6,593,553 B2 | 7/2003 | Whitfield | |
| 6,909,843 B1 | 6/2005 | Fabrizio | |
| 7,007,316 B2 | 3/2006 | Lutz, II | |
| 7,039,305 B1 | 5/2006 | Chen | |
| 7,046,922 B1 * | 5/2006 | Sturm | F24H 9/2028 392/482 |
| 7,156,425 B2 | 1/2007 | Atkinson | |
| 7,190,894 B2 | 3/2007 | Chamberlain, Jr. | |
| 7,293,914 B2 | 11/2007 | Wang | |
| 7,324,746 B2 | 1/2008 | Tanaka et al. | |
| 7,592,572 B2 | 9/2009 | Schlipf | |
| 7,593,625 B2 | 9/2009 | Kamikawa et al. | |
| 7,668,444 B2 | 2/2010 | Tsai | |
| 7,744,008 B2 | 6/2010 | Chapman, Jr. et al. | |
| 7,857,002 B2 | 12/2010 | Reck | |
| 7,972,077 B2 | 7/2011 | Kim | |
| 8,104,434 B2 | 1/2012 | Fabrizio | |
| 8,165,461 B2 | 4/2012 | Sullivan | |
| 8,280,236 B2 | 10/2012 | Fabrizio | |
| 8,380,056 B2 | 2/2013 | Evans | |
| 8,426,779 B2 | 4/2013 | Schlipf | |
| 8,577,211 B2 | 11/2013 | Lucker et al. | |
| 9,140,466 B2 | 9/2015 | Jurczyszak et al. | |
| 9,234,674 B2 | 1/2016 | Hayden et al. | |
| 10,222,091 B2 | 3/2019 | Hankins et al. | |
| 2002/0008970 A1 | 1/2002 | Hanson et al. | |
| 2003/0026603 A1 * | 2/2003 | Castaneda | F24H 1/142 392/483 |
| 2004/0051313 A1 | 3/2004 | Trouyet | |
| 2004/0069517 A1 | 4/2004 | Olson | |
| 2004/0098831 A1 | 5/2004 | Elmer | |
| 2005/0072103 A1 | 4/2005 | Hopwood | |
| 2006/0168756 A1 | 8/2006 | Sato et al. | |
| 2006/0215178 A1 | 9/2006 | Seko et al. | |
| 2006/0222349 A1 | 10/2006 | Sturm et al. | |
| 2007/0017265 A1 | 1/2007 | Andersson | |
| 2007/0023418 A1 | 2/2007 | Schlipf | |
| 2008/0028512 A1 | 2/2008 | Hughson | |
| 2008/0152331 A1 | 6/2008 | Ryks | |
| 2008/0274823 A1 | 11/2008 | Lindner | |
| 2008/0285964 A1 | 11/2008 | Sullivan | |
| 2009/0025399 A1 | 1/2009 | Kamen et al. | |
| 2009/0034947 A1 | 2/2009 | Tsai | |
| 2009/0116826 A1 | 5/2009 | Evans | |
| 2010/0068123 A1 | 3/2010 | Edwin et al. | |
| 2010/0086289 A1 | 4/2010 | Johnson et al. | |
| 2010/0093205 A1 | 4/2010 | Stone et al. | |
| 2010/0126108 A1 | 5/2010 | Andrikopoulos | |
| 2010/0212752 A1 | 8/2010 | Fima | |
| 2011/0203781 A1 * | 8/2011 | Ellingwood | F24H 1/403 165/173 |
| 2011/0233191 A1 | 9/2011 | Gubler et al. | |
| 2011/0240269 A1 | 10/2011 | Mackenzie | |
| 2011/0318090 A1 | 12/2011 | Lai | |
| 2012/0055917 A1 | 3/2012 | Kimmins et al. | |
| 2012/0063755 A1 | 3/2012 | Lucker et al. | |
| 2012/0141100 A1 | 6/2012 | Evans | |
| 2012/0237191 A1 | 9/2012 | Clark | |
| 2012/0275775 A1 | 11/2012 | Iskrenovic | |
| 2013/0034344 A1 | 2/2013 | Lutz et al. | |
| 2013/0156492 A1 | 6/2013 | Maier | |
| 2014/0023352 A1 | 1/2014 | Jurczyszak et al. | |

FOREIGN PATENT DOCUMENTS

| | | |
|---|---|---|
| DE | 19726288 A1 | 6/1997 |
| EP | 2573642 A2 | 3/2013 |

(56) References Cited

FOREIGN PATENT DOCUMENTS

JP         11-148716 A     6/1999
WO       9831045 A2     7/1998

OTHER PUBLICATIONS

PCT, "International Search Report and Written Opinion" Application No. PCT/US2013/050897, mailed Jan. 3, 2014.
PCT, "International Search Report and Written Opinion" Application No. PCT/US2013/32298, mailed Mar. 15, 2013.

* cited by examiner

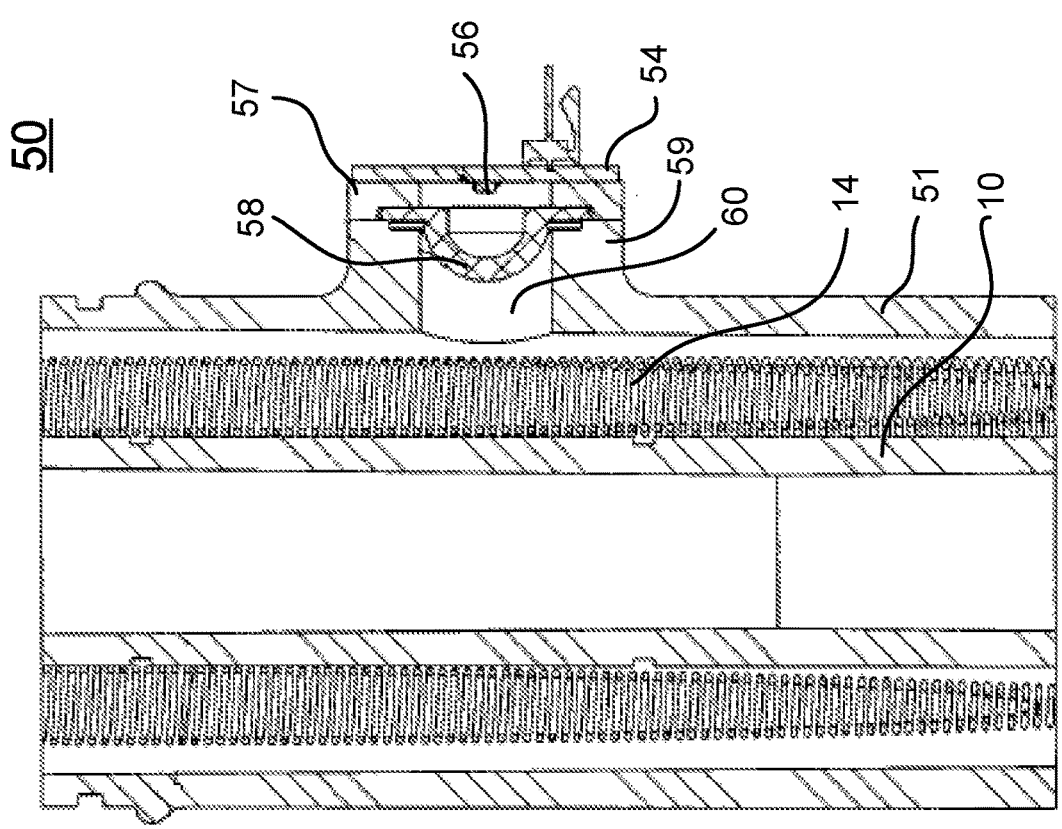
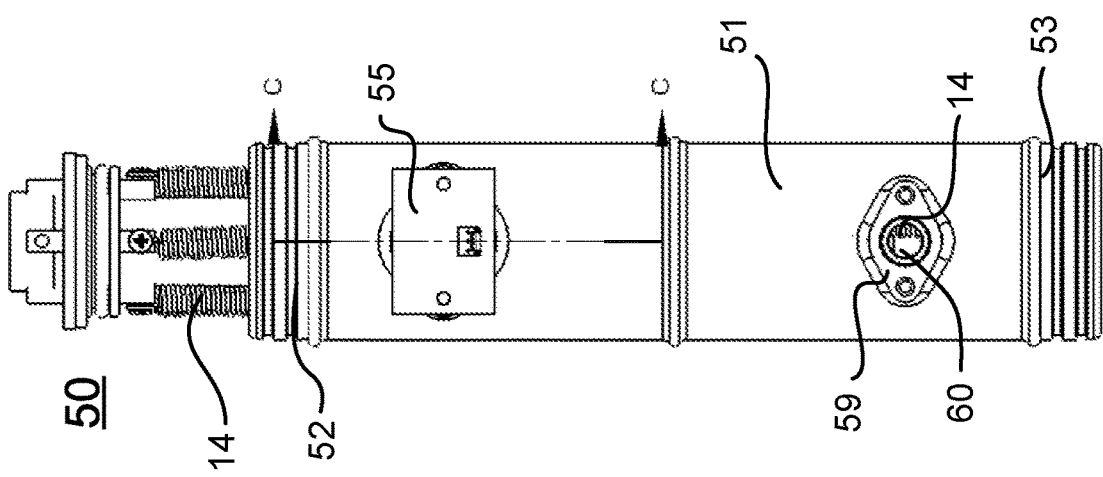

MODULAR HEATING SYSTEM

CROSS REFERENCE TO RELATED APPLICATIONS

This Application is a continuation application of U.S. application Ser. No. 13/943,495, filed on Jul. 16, 2013, which is based upon and claims the benefit of priority from U.S. Provisional Application No. 61/672,336, filed Jul. 17, 2012, and U.S. Provisional Application No. 61/740,653, filed on Dec. 21, 2012, and the entire contents of each which are incorporated herein by reference.

BACKGROUND

Tankless water heaters have become more pervasive in recent years as a way to instantaneously provide heated water. A variety of methods for heating water are available, such as bare wire heaters, to provide this instantaneously heated water. Tankless water heaters also provide the ability to heat water on demand and do not need to constantly maintain a hot water supply as required with conventional water heaters. However, issues can arise if the flow of water passing through the tankless water heater is too great for the tankless water heater to process effectively. Further, tankless water heaters can sometimes be bulky and require a lot of space for installation. Manufacturing and assembly of tankless water heaters can also be troublesome due to the complexity of their design.

SUMMARY OF ILLUSTRATIVE EMBODIMENTS

In selected embodiments, a heating unit includes a first manifold having at least one inlet, a second manifold connected to the first manifold and having at least one outlet, and a third manifold. The heating unit also includes one or more heating systems which extend from the third manifold to the first manifold via the second manifold, where the one or more heating systems have an inner tube and an outer tube. Further, the heating unit includes a fluid flow path from the at least one inlet to the at least one outlet via the first manifold, an area between the inner tube and outer tube, the interior of the inner tube and the second manifold.

The details of one or more implementations are set forth in the accompanying drawing and description below. Other features, objects, and advantages will be apparent from the description and drawings, and from the claims.

BRIEF DESCRIPTION OF FIGURES

FIG. 5A is a side view of a heating chamber in relation to the heating unit according to one example.

FIG. 5B is a cross sectional view of the heating chamber of FIG. 5A having an optical assembly according to one example.

Like reference symbols in various drawing indicate like elements.

DETAILED DESCRIPTION OF THE ILLUSTRATIVE EMBODIMENTS

Figure 1A:
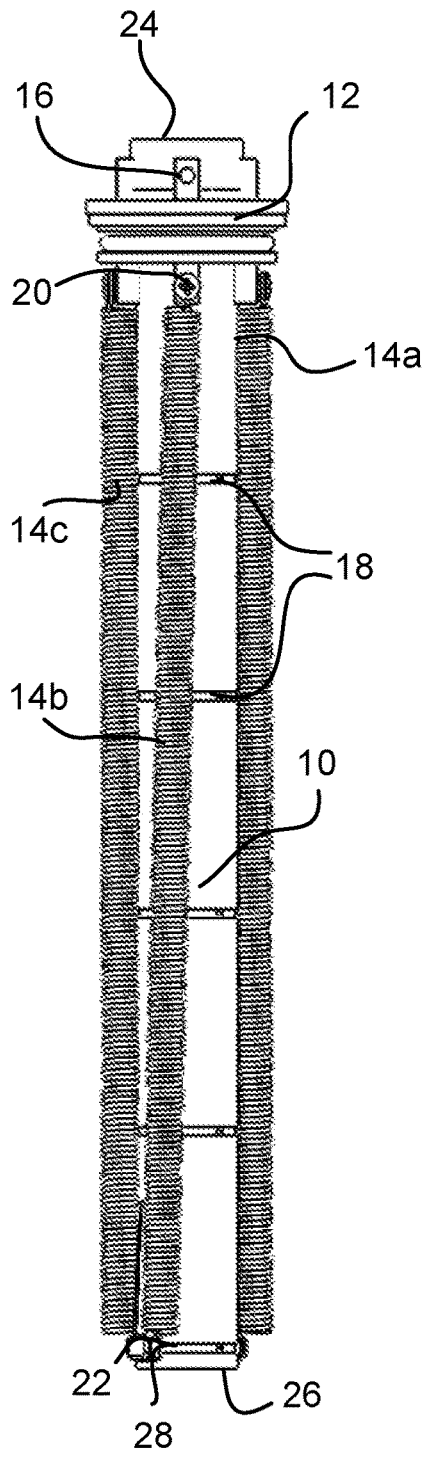
FIG. 1A is a side view of a heating unit according to one example.

Selected embodiments are now described by referring now to the drawings, wherein like reference numerals designate identical or corresponding parts throughout the several views. It is noted that as used in the specification and the appending claims, the singular forms "a," "an," and "the" can include plural references unless the context clearly dictates otherwise.

Bare Wire Heating Unit

Figure 1B:
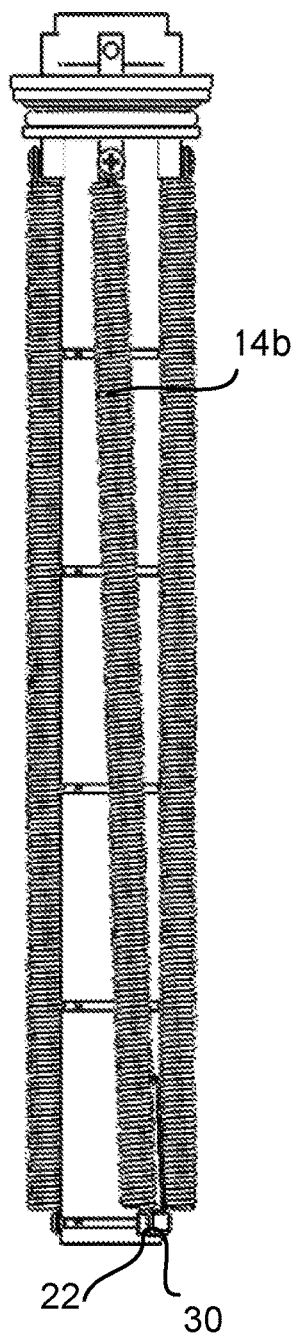
FIG. 1B is a side view of the heating unit according to one example.
Figure 1C:
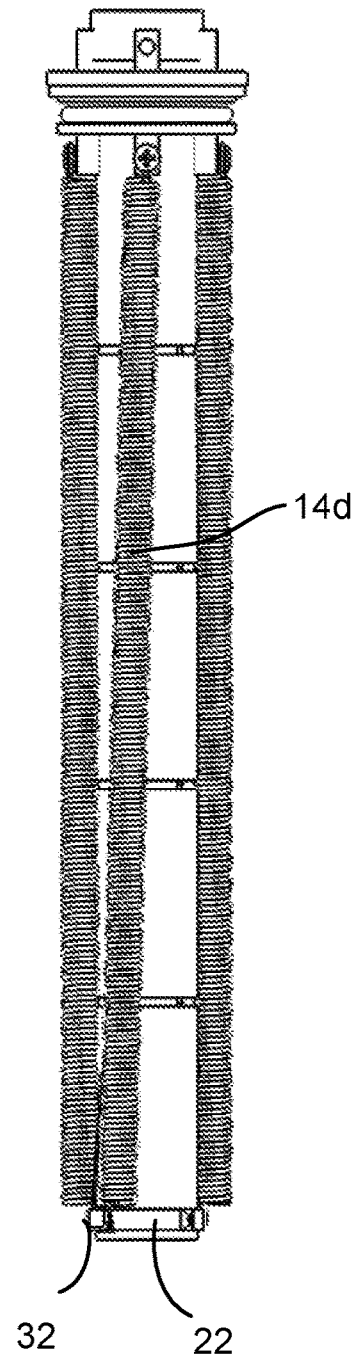
FIG. 1C is a side view of the heating unit according to one example.

FIGS. 1A-1C illustrate a heating unit 1 according to an exemplary embodiment. In FIG. 1A, the heating unit 1 includes a tube 10 having a cylindrical shape with a flange 12 at one end. The flange 12 provides a connection point to external components with respect to an outlet 24 of the tube. The tube 10 is molded or machined to have at least one indexed groove 18 around a circumference of the tube 10. The at least one indexed groove 18 is a recess provided in the tube 10 which runs continuously around the circumference of the tube 10. In selected embodiments, the tube 10 will have a plurality of any number of indexed grooves 18 located at predetermined intervals along the body of the tube 10 with respect to a length of the tube 10 as illustrated in FIGS. 1A-1C. The indexed grooves 18 may be machined or molded at equal distances from each other based on the length of the tube 10 or may be machined or molded at preset positions along the length of the tube 10. Additionally, the tube 10 has an inlet 26 through which fluids may be transmitted through the tube 10. In selected embodiments, however, the inlet 26 and outlet 24 may be reversed if a flow of fluids is reversed.

The tube 10 is molded or machined to act as a supporting structure for at least one electrical resistance heating element 14 which runs the length of the tube 10. In selected embodiments and as illustrated in FIGS. 1A-1C, the heating unit 1 may comprise a plurality of electrical resistance heating elements 14a-14d. Each electrical resistance heating element 14 is mechanically connected to the tube 10 via a termination connector 16 which extends through the flange 12 and at least one retention clip 22 provided on one of the indexed grooves 18. The termination connector 16 includes at least one hole so that a fastening device 20, such as a screw, can be used to affix the electrical resistance heating element 14 to the tube 10. In selected embodiments, the termination connector 16 may be a single component or two separate components attached to either side of the flange 12. Electricity is externally applied to the electrical resistance heating elements 14 from an external source, such as an electrical circuit, via the termination connector 16. In selected embodiments and as illustrated in FIGS. 1A-1C, the heating unit 1 will include a single retention clip 22 to which one or more of the electrical resistance heating elements 14 are connected. However, multiple retention clips 22 can be provided within one or more of the indexed grooves 18 thereby providing multiple connection points for one or more electrical resistance heating elements 14. Further, retention clip 22 can be molded or machined as part of the tube 10 or can be a separate component which is removable from the tube 10.

The retention clips 22 are formed to provide pivot points for the electrical resistance heating elements 14 connected thereto. In other words, the retention clips 22 can be linearly adjusted along the indexed grooves 18 at which the retention clip is located to linearly adjust the location of the placement of the electrical resistance heating elements 14 on the surface of the tube 10. For example, in FIG. 1A, the electrical resistance heating element 14b is illustrated as connected to the retention clip 22 at a first position 28 along the bottom of the tube 10. The first position 28 is determined based on the adjustment of the retention clip 22 within the indexed groove 18. In FIG. 1B, however, it can be seen that the electrical resistance heating element 14b is located at a second position 30 based on the linear adjustment of the retention clip 22 within the indexed groove 18. Further, FIG. 1C illustrates the opposite side of the tube 10 with respect to FIGS. 1A and 1B and illustrates a first position 32 of the electrical resistance heating element 14d at the bottom of the tube 10 based on the linear adjustment of the retention clip 22.

The ability to linearly adjust the electrical resistance heating elements 14 within an indexed groove 18 via the retention clip provides numerous advantageous. For example, each system in which the heating unit 1 is applied can be tested to determine the best heat transfer properties based on the particularities of the system such that the position of the electrical resistance heating elements 14 can be adjusted to maximize heat transfer within that system. Further, should the heat transfer characteristics change at some point, the locations of the electrical resistance heating elements 14 of the heating unit 1 can easily be modified to compensate for this change.

Figure 2A:
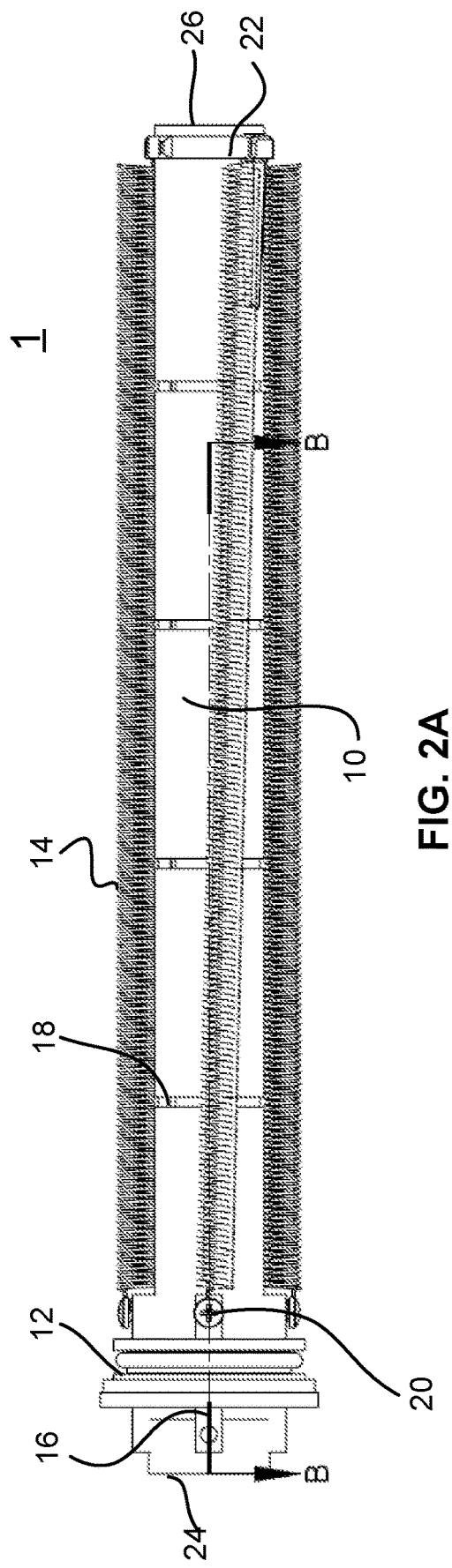
FIG. 2A is a side view of the heating unit identifying a cross-section according to one example.
Figure 2B:
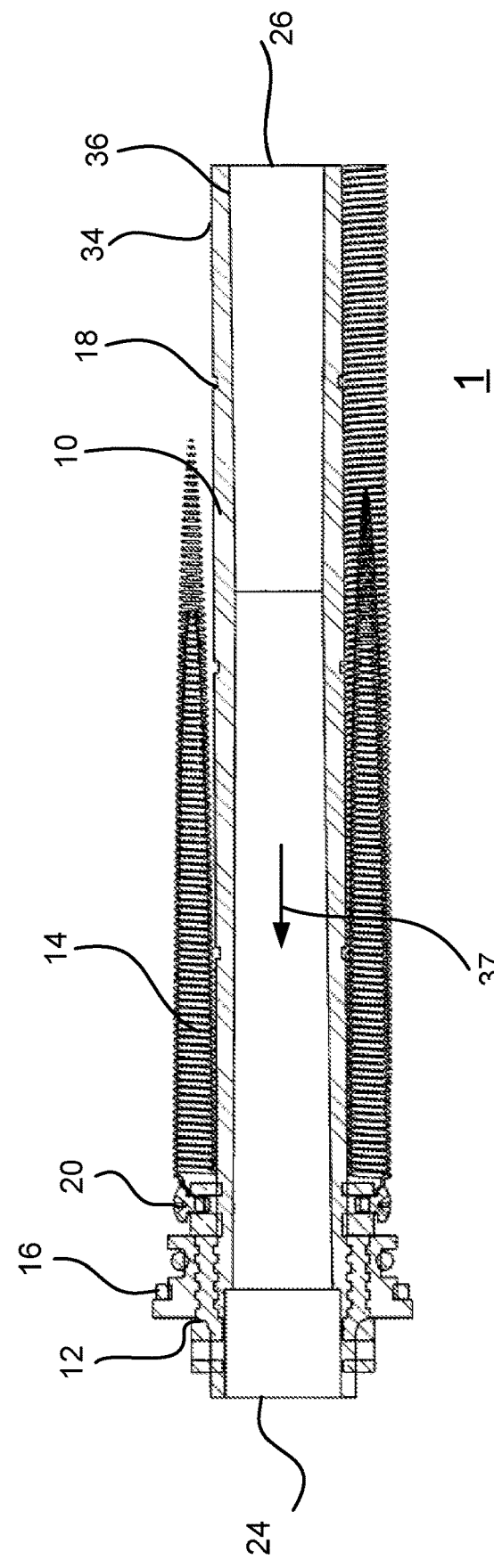
FIG. 2B is a cross-sectional view of the heating unit of FIG. 2A according to one example.

FIG. 2A illustrates a side view of the heating unit 1 according to an exemplary embodiment. Like designations are repeated and therefore the heating unit 1 provides a tube 10 having an inlet 26 and an outlet 24. The heating unit 1 further includes a flange 12, termination connection 16, indexed grooves 18, a retention clip 22 and electrical resistance heating elements 14. FIG. 2B illustrates a cross sectional view of the heating unit 1 of FIG. 2A cut across the segment "B" illustrated in FIG. 2A.

As illustrated in FIG. 2B, the heating unit 1 has a termination connector 16, flange 12, fastening device 20 and electrical resistance heating elements 14. FIG. 2B also clearly illustrates the indexed grooves 18 running around a circumference of an outer surface of the tube 10. As previously described herein, the indexed grooves 18 are recesses in an outer surface of the tube 10. The depth of the recesses of the indexed grooves 18 can be any amount of displacement from the outer surface 34 of the tube 10 to an inner surface 36 of the tube 10. As illustrated in FIG. 2B, the indexed grooves 18 are machined or molded in a straight circular continuous fashion around the circumference of the tube 10. However, in other selected embodiments, the indexed grooves 18 may be machined or molded in different shapes around the circumference of the tube 10 such that the retention clip 22 can be adjusted in various directions with respect to the length of the tube 10. Further, in selected embodiments, the tube 10 may be machined or molded to contain different combinations of the above-described indexed grooves 18. FIG. 2B also illustrates a fluid flow path 37 through which fluids flow from the inlet 26 through the tube 10 to the outlet 24. The fluid flowing into the tube 10 is fluid that has been heated by flowing over the electrical resistance heating elements 14 and/or fluid that is heated by passing through the tube 10 which is heated from the exterior by the electrical resistance heating elements 14. As previously discussed herein an in selected embodiments, the fluid flow path 37 may be reversed thereby reversing the inlet 26 and outlet 24.

Figure 3B:
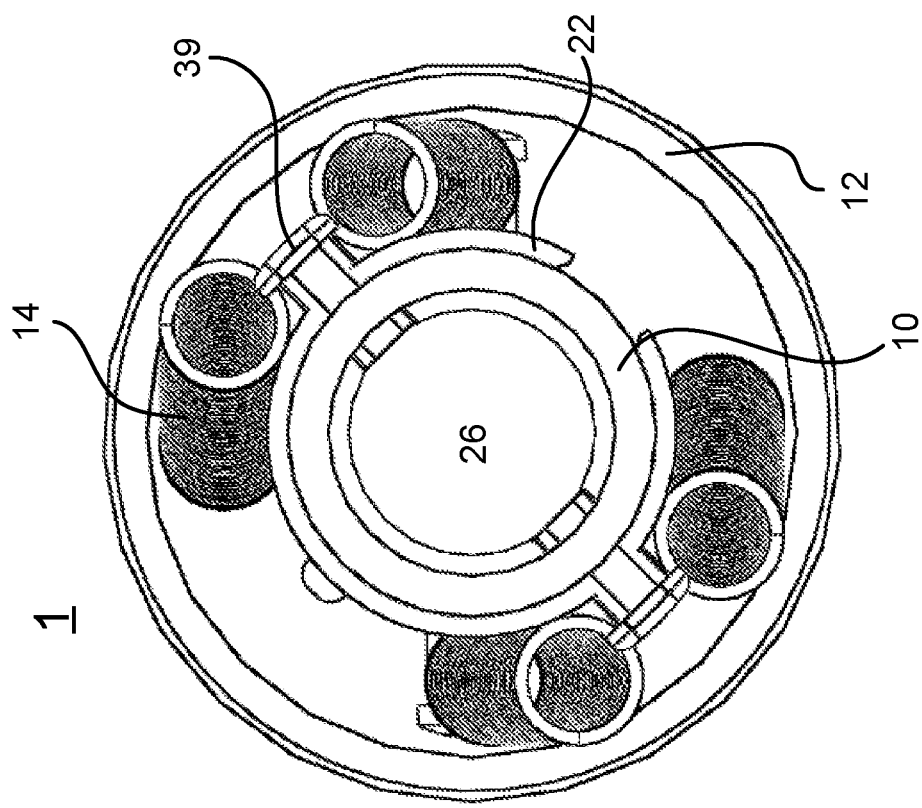
FIG. 3B is a bottom view of the heating unit according to one example.
Figure 3A:
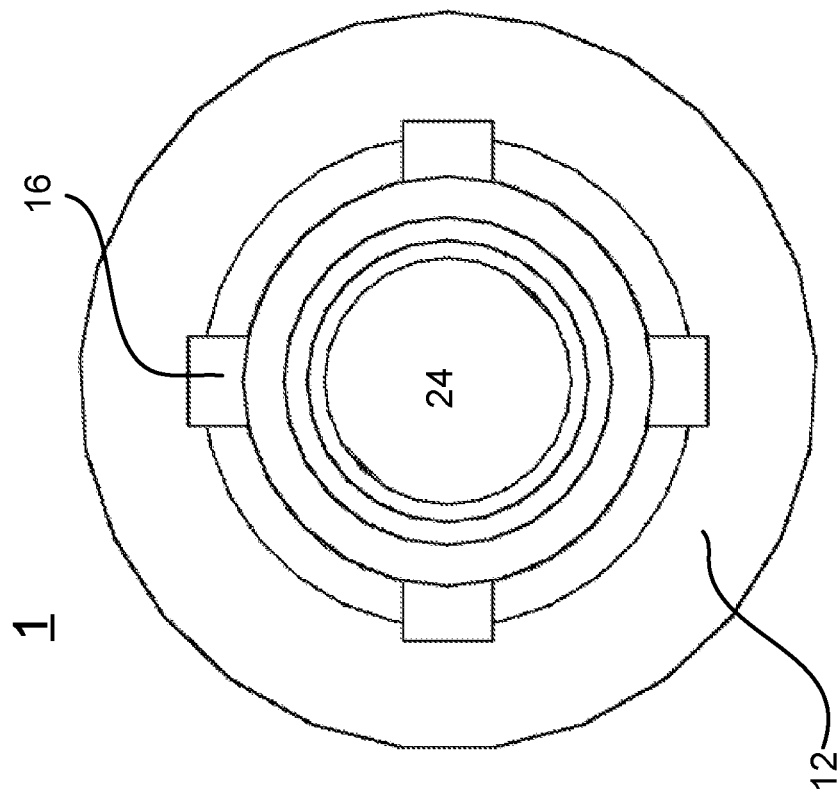
FIG. 3A is a top view of the heating unit according to one example.

FIG. 3A illustrates a top view of the heating unit 1 according to an exemplary embodiment. As illustrated in FIG. 3A, there is a top view of the flange 12 having the plurality of termination connections 16 for mechanically and electrically attaching each respective electrical resistance heating element 14. FIG. 3A further illustrates an exemplary fluid flow direction coming out of the tube 10 via outlet 24. FIG. 3B illustrates a bottom view of the heating element according to an exemplary embodiment. As illustrated in FIG. 3B, there is a bottom view of the flange 12 and the tube 10. A plurality of electrical resistance heating elements 14 are attached to the retention clip 22 which is placed over and/or within an indexed groove 18 (not visible due to angle) of the tube 10. In selected embodiments, the electrical resistance heating elements 14 are attached to the retention clip 22 via at least one hook 39 of the retention clip 22. The hook 39 may in selected embodiments be covered with a shielding element in order to prevent damage from heat emanating from connected electrical resistance heating elements 14. As the retention clip 22 is removable in selected embodiments, the retention clip 22 is not required to fully extend around the circumference of the tube 10. However, in selected embodiments the retention clip 22 may fully extend around the tube 10. FIG. 3B also illustrates an exemplary fluid flow direction going into the tube via inlet 26.

Figure 4A:
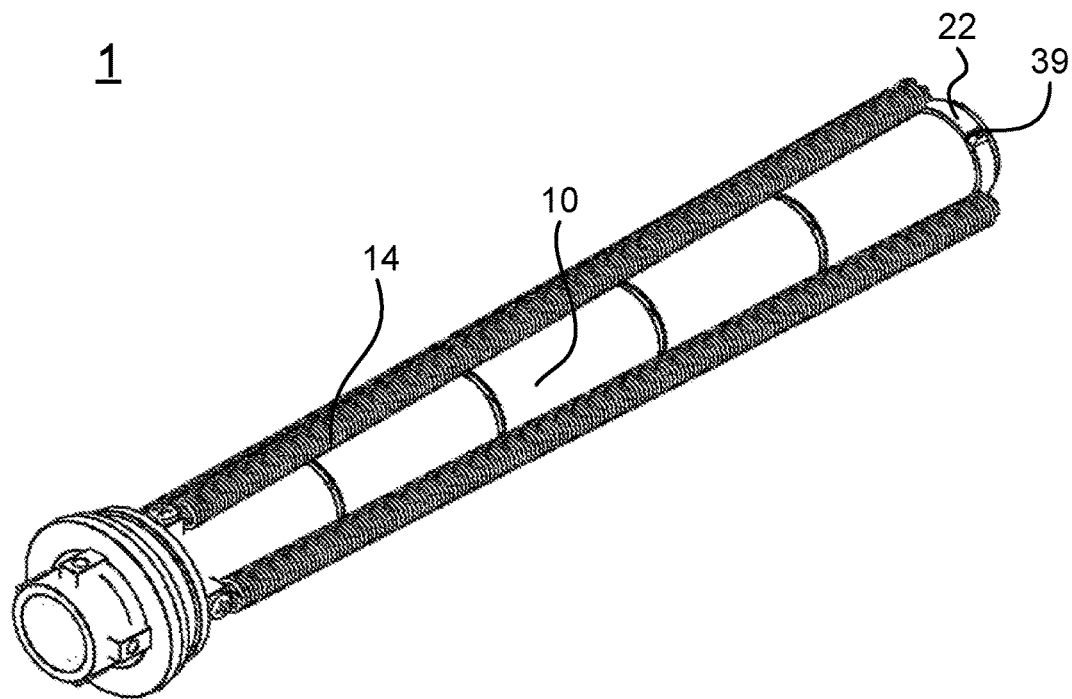
FIG. 4A is a perspective view of the heating unit according to one example.

FIG. 4A illustrates a perspective view of the heating unit 1 according to an exemplary embodiment. In FIG. 4A, it can be seen that the electrical resistance heating elements 14 are positioned along a length of the surface of the tube 10 up until a connection with the retention clip 22. Therefore, as illustrated in FIG. 2B, the electrical resistance heating elements 14 are positioned on the surface of the tube 10.

Figure 4B:
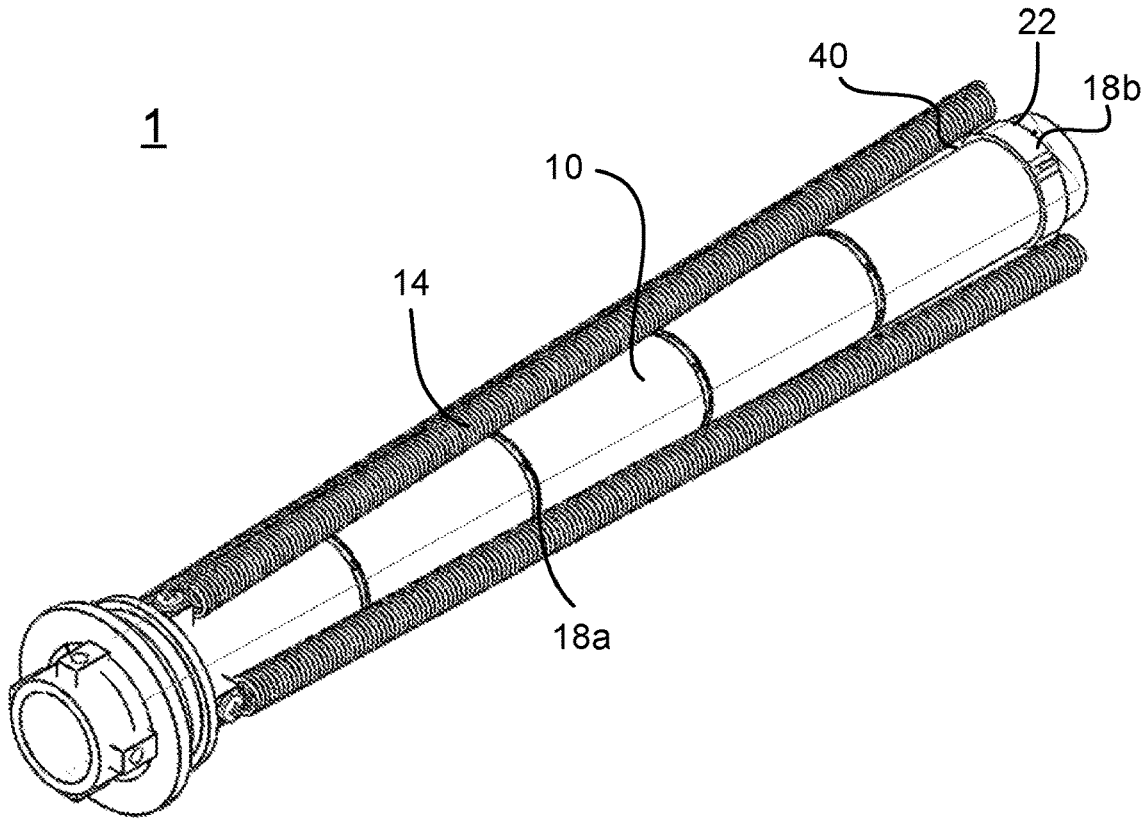
FIG. 4B is a perspective view of the heating unit according to one example.

However, alternatively or in addition to, electrical resistance heating elements 14 may be suspended away from the surface of the tube by using the retention clip 22 as a support structure as illustrated in FIG. 4B. In this instance, the electrical resistance heating element 14 is attached to the retention clip 22 via the hook 39 raised from a surface of the retention clip 22. Accordingly, as illustrated in FIG. 4B, by using the retention clip 22 as a support structure, there is a gap 40 between a surface of the tube 10 and a surface of the electrical resistance heating element 14. Further, in selected embodiments, each electrical resistance heating element 14 can be raised off a surface of the tube 10 by using the retention clip 22 as support structure in a similar fashion. Further, additional retention clips 22 may be provided at various indexed grooves 18 thereby providing for gaps between the surface of the tube 10 and a surface of the electrical resistance heating elements 14 at various locations along the length of the tube 10. For example, in selected embodiments, a first retention clip (not shown) could be provided at a first indexed groove 18*a* and the retention slip 22 could be placed at a second indexed groove 18*b* (as illustrated) thereby raising an entirety of the electrical resistance heating element 14 off the surface of the tube 10 and providing a large gap for enhanced fluid flow therebetween.

The use of retention clips 22 as a support structures to provide a gap between a surface of the tube 10 and the surface of the electrical resistance heating elements 14 provides various advantages. For instance, by using the retention clips in this fashion, there will be an increased fluid flow over the electrical resistance heating elements 14 thereby providing an enhanced cooling effect that lowers the risk of burnout or damage to the electrical resistance heating elements 14. Further, connecting the electrical resistance heating elements 14 to the retention clip 22 in this fashion provides for a predetermined amount of tension of the electrical resistance heating elements 14 thereby preventing sag or looseness of the electrical resistance heating elements 14. The use of one or more retention clips 22 also provides a more even temperature distribution when heating liquids passing over the electrical resistance heating elements 14 and further helps to prevent localized boiling on a surface of the electrical resistance heating elements 14 which may be caused by low flow velocities or areas of stagnant flow in contact with the surface of the electrical resistance heating elements 14. Alternatively, or in addition, the indexed grooves 18 themselves could be molded or machined such that they are raised above the surface of the tube 10 thereby providing a support structure on which to raise the electrical resistance heating elements 14 above a surface of the tube 10. Retention clips 22 could then be used on the raised indexed grooves 18 to adjust the position of the electrical resistance heating elements 14 as previously described herein.

FIG. 5A illustrates a heating system 50 comprising a heating chamber 51 that partially encloses the heating unit 1 according to an exemplary embodiment. As illustrated in FIG. 5A, the heating chamber 51 includes a first connecting portion 52 for connecting to external components. The heating chamber 51 also includes a second connecting portion 53 for connecting to other parts external to the heating system 50. The heating chamber 51 further includes at least one connection port 59 having an opening 60 through which at least one electric resistive heating elements 14 is visible. In other words, the heating chamber 51 is molded or machined such that it includes at least one opening 60 to the components of the heating unit 1 when the heating unit is enclosed by the heating chamber 51. FIG. 5A further illustrates an optical assembly 55 affixed to the opening 60 of the connection port 59. It is noted that in selected embodiments, the heating chamber 51 may include a plurality of connection ports 59 having corresponding openings 60 as well as one or more corresponding optical assemblies 55.

Figure 6:
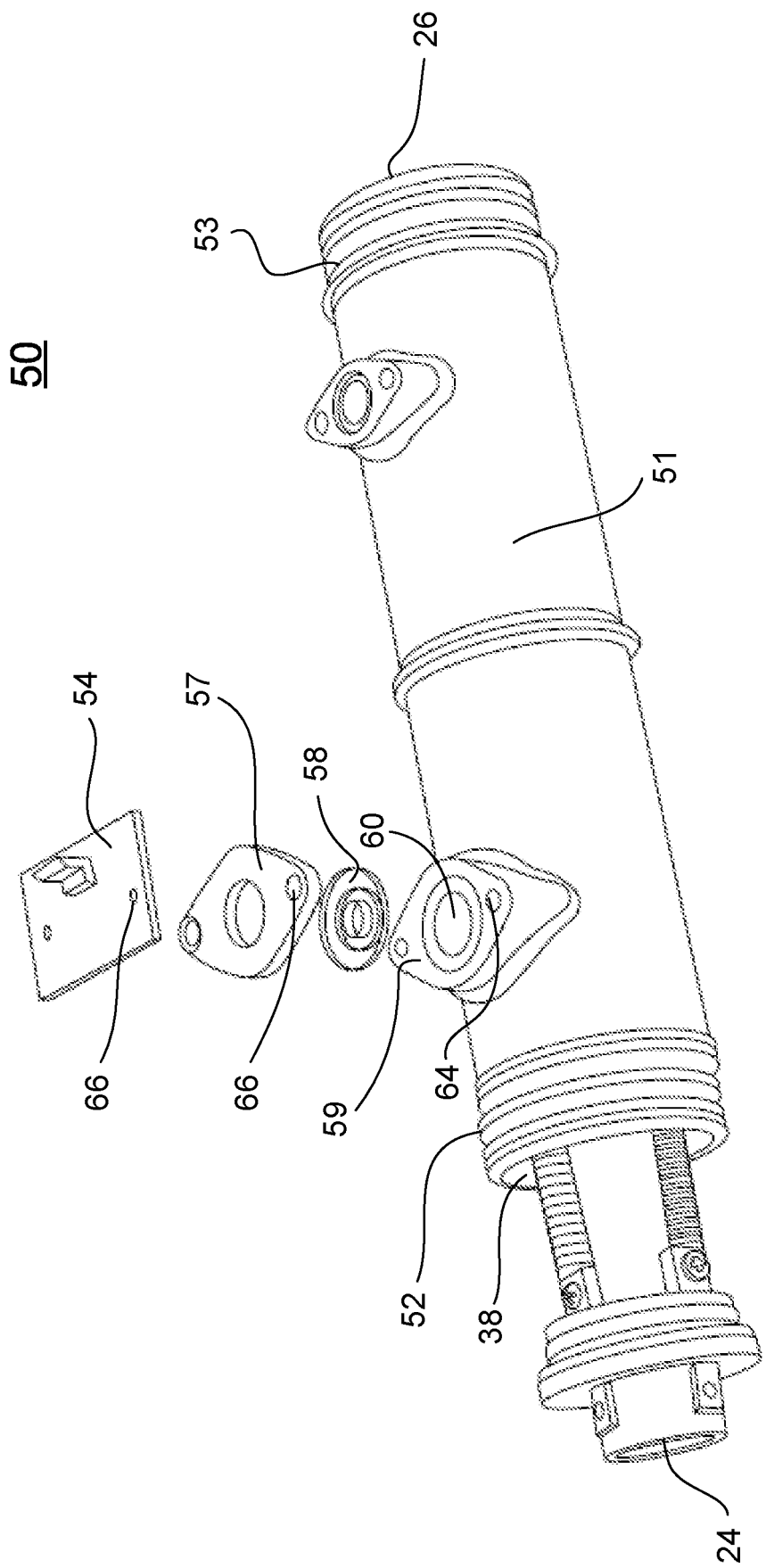
FIG. 6 is a three-dimensional view of the formation of the optical assembly on the heating chamber according to one example.

FIG. 5B illustrates a cross sectional view of the heating system 50 along a cross section cut identified by the letter "C" in FIG. 5A. In FIG. 5B, the connection port 59 provides an opening 60 within the surface of the heating chamber 51 such that the electrical resistance heating element 14 located at or near that position is visible via the opening 60. The optical assembly 55 comprises at least a backplane 54 having at least one optical sensor 56 attached thereto, a light blocking element 57 and a translucent filter 58. As illustrated in FIG. 5B, the translucent filter 58 is provided over the opening 60 of the connection port 59. The light blocking element 57 is provided over the translucent filter 58 and the backplane 54 is provided over the light blocking element 57 with the at least one optical sensor 56 of the backplane being placed on a side facing the light blocking element 57, translucent filter 58 and opening 60. The optical sensor 56 may contain a lens having a smooth surface to prevent calcification or particle adhesion. The optical assembly 55 may also be adjustably positioned at a distance to have a particular focal point with respect to the electrical resistance heating elements 14 such that FIG. 6 illustrates a method of assembly of the system 50 and optical assembly 55 over a connection port 59 of the heating chamber 51. As illustrated in FIG. 6, the heating unit 1 having electrical resistance heating elements 14 is partially enclosed within the heating chamber 51 such that there is provided a flow channel 38 over the electrical resistance heating elements 14 between the tube 10 and heating chamber 51. In selected embodiments, liquid flow is externally directed into the flow channel 38 such that the liquid flows towards the inlet 26. The liquid is then externally directed into the inlet 26 through the tube 10 and out the outlet 24. Accordingly, liquids are efficiently heated by being energized both while flowing over the electrical resistance heating elements 14 and while flowing through the tube 10. In selected embodiments, the heating chamber 51 may fully enclose the heating unit 1 except for at the inlet 26 end such that fluid may come into the heating chamber 51 via the area surrounding the inlet 26 such that flow is directed around the electrical resistance heating elements 14 and into the inlet 26.

A plurality of connection ports are also illustrated in FIG. 6. Connection port 59 having an opening 60 is raised above an outer surface of the heating chamber 51. However, in selected embodiments, the connection port 59 may be flush with the outer surface of the heating chamber 51. The translucent filter 58 is placed over all or a portion of the connection port 59 and fully covers the opening 60. The translucent filter 58 is illustrated in FIG. 6 having a concave shape but can take any shape as would be recognized by one of ordinary skill in the art. The light blocking element 57 is then positioned over the translucent filter 58 as well as the connection port 59. The back plane 54 is then positioned over the light blocking element 57. As the optical sensor 56 is on a side of the backplane 54 facing the opening 60, the optical sensor 56 is on the lower side of the backplane 54 and is not visible in FIG. 6. At least one fastener location 64 is also provided within the connection port 59 such that corresponding fastening locations 66 of the light blocking element 57 and backplane 54 can be firmly affixed to the heating chamber 51.

The optical assembly 55 provides the heating system 50 with the ability to efficiently detect overheating of the electrical resistance heating elements 14. Under normal conditions, the electrical resistance heating elements 14 will not emit any visible light and will only emit heat energy. However, if at least one of the electrical resistance heating elements 14 is dry fired without the presence of a fluid or has been energizing stagnant fluids for extended periods, the electrical resistance heating element 14 will begin to emit light energy in the visible spectrum. For example, the electrical resistance heating element 14 may begin in this instance to emit a visible red, orange or yellowish glow. The optical sensor 56 is an optical sensor as would be recognized by one of ordinary skill in the art and is calibrated, selected and/or filtered such that the optical sensor 56 will detect light emitted from one or more overheating electrical resistance heating element 14. To reduce the amount of non-visible infrared emission from one or more of the electrical resistance heating elements 14 which could cause false readings by the optical sensor 56, at least one translucent filter 58 is provided as described herein which filters the infrared emission before it is detected by the optical sensor 56. In selected embodiments, the optical sensor 56 may also be configured to detect infrared wavelengths that co-relate to predetermined element surface temperatures that are above normal operating conditions for the electrical resistance heating elements 14. This provides an advanced warning as to whether an electrical resistance heating element 14 may be overheating before the electrical resistance heating element 14 starts to emit light energy in the visible spectrum.

To prevent further false readings by the optical sensor 56, the light blocking element 57 is provided over a portion of the translucent filter 58 to prevent ambient light from entering the opening 60 of the heating chamber 51 between the heating chamber 51 and the translucent filter 58 and/or the translucent filter 58 and the backplane 54. Further, in selected embodiments, the heating chamber 51 may be molded or machined from an opaque material to further reduce the amount of ambient light that may enter an inner surface of the heating chamber 51. Additionally, in selected embodiments, the backplane 54 may consist of Printed Circuit Board (PCB) made of an opaque material to prevent ambient light from entering a backside of the PCB and affecting readings made by the optical sensor 56. Power is provided to the optical sensor 56 via the backplane 54 which is powered from an external source as would be understood by one of ordinary skill in the art.

The heating system 50 described above having a heating chamber 51 comprising an optical assembly 55 which can detect overheating of electrical resistance heating elements 14 of the enclosed heating unit 1 provides numerous advantages. At any point at which the optical sensor 56 detects visible light being emitted from at least one of the electrical resistance heating elements 14, a signal may be generated by the optical sensor 56 and processed by the PCB to transmit a signal to cut power to a specific overheating electrical resistance heading element 14 or to all the electrical resistance heating elements. Signals output from the optical sensor 56 may also be further filtered by software or hardware to ignore ambient light from external sources and limit detection and warning to light emitted by the electrical resistance heating elements 14 in a particular visible spectrum. Further, detecting overheating via the optical sensor 56 through the detection of light provides extremely high speed of light reaction times for shutting down one or more electrical resistance heating elements 14. Therefore, the heating system 50 can easily prevent damage to the electrical resistance heating elements 14 or other parts thereby increasing the longevity of the system as a whole and reducing cost for replacement parts.

It should be noted that while the description above with respect to FIGS. 1-6 describes various features of the heating unit 1 and heating system 50, numerous modifications and variations are possible in light of the above teachings. For example, each electrical resistance heating element 14 can be provided a different length and connected to the tube via a retention clip 22 at an indexed groove 18 different from that of other electrical resistance heating elements 14. Alternatively, each electrical resistance heating element 14 can be of a shorter length than that illustrated in FIGS. 1A-1C and attached to the same retention clip 22 at an indexed groove 18 closer to the flange 12. This allows the use of the same tube 10 to provide various configurations based on individual client needs, to provide optimized configurations for heat transfer based on particularities of various systems and to provide a "one size fits all" to lower production costs. Further, systems requiring less heat may employ fewer electrical resistance heating elements 14 whereas systems requiring more heat may employ additional electrical resistance heating elements.

Additional configurations are possible via design options for the heating chamber 51 such that the heating chamber 51 may be machined or molded with one or more connection ports 59 and openings 60. Accordingly, the heating chamber 51 may have connection ports 59 on various sides of the heating chamber 51 such that a plurality of electrical resistance heating elements 14 are visible through openings 60. Accordingly, a plurality of optical assemblies 55 may be affixed to the connection ports 59 to provide enhanced thermal detection and safety activation procedures to reduce the chances of damage to the electrical resistance heating elements 14. To provide the heating system 50 at a lower cost, fewer optical assemblies 55 may be used to detect light emitted from one or more electrical resistance heating elements 14. In this configuration, the optical sensor 56 may be configured to detect lower level amounts of visible light such that light emitted by overheating electrical resistance heating elements 14 on the opposite side of the connection port 59 of which the optical assembly 55 is attached may be detected. Further, in selected embodiments reflective optics may be placed on the outer surface of the tube 10 and/or an inner surface of the heating chamber 51 such that light emitted by overheating electrical resistance heating elements 14 is transmitted through the interior of the heating system 51 and/or magnified for enhanced detection by the optical sensor 56. Further, the interior of tube 10 may be manufactured to have a glossy finish thereby providing enhanced reflective properties. In this configuration, cost may be saved as fewer optical assemblies may be required.

The components described above can be manufactured, in selected embodiments, via injection molding or machining as would be understood by one of ordinary skill in the art. Therefore, the tube 10 and heating chamber 51 may be molded into any shape or made from any material, such as thermoplastic or thermosetting polymers, as would be understood by one of ordinary skill in the art. Accordingly, common polymers such as epoxy, phenolic, nylon, polyethylene or polystyrene may be utilized. This material is fed into a heated barrel, mixed and forced into a mold cavity (formed of a material such as steel or aluminum and machined to a form that features the desired part) where it cools and hardens to the configuration of the cavity. Exemplary molding machines that may be utilized for such a process include a Ferromatik milcaron injection molding machine or those built by Arburg.

The components described above, such as the heating unit 1 and heating chamber 51, may be also be precision machined manually or automatically by computer numerical control (CNC) as would be understood by one of ordinary skill in the art. Accordingly, the components can be formed of metal, such as steel or aluminum, and formed via a combination of turning, drilling, milling, shaping, planning, boring, broaching and sawing.

The electrical resistance heating elements 14 can be made from any type of alloy as would be understood by one of ordinary skill in the art. For example, the electrical resistance heating elements 14 may consist of a high temperature resistance alloy such as nickel-chrome alloy or iron chrome aluminum alloy. These may be formed as coils as illustrated in FIGS. 1-6 or may be looped or sinuously wound around the tube 10. The electrical resistance heating elements 14 may be one continuous element, separate elements and sheathed or sheathless.

The optical sensor 56 in selected embodiments may be any electro-optical sensor as would be recognized by one of ordinary skill in the art. The optical sensor measures the physical quantity of light rays and converts this information into electronic signals which are process by the PCB. The translucent filter 57 may be any filter that can block infrared wavelengths but pass visible light as would be understood by one of ordinary skill in the art. For instance, the translucent filter may be an infrared cut-off filter or heat-absorbing filter which reflects or blocks infrared wavelengths while passing visible light.

Modular Heating Unit

Figure 7:
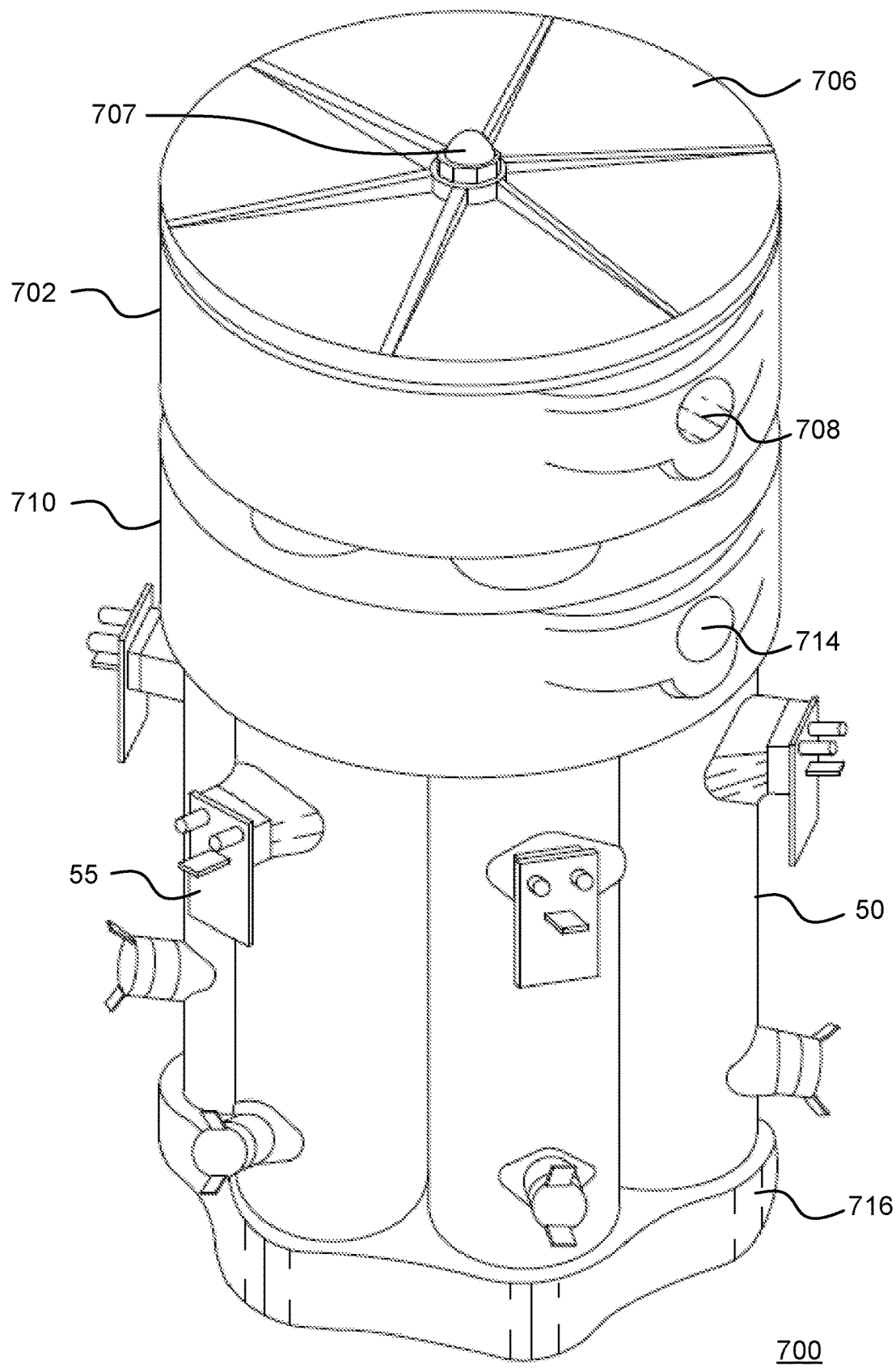
FIG. 7 is an exterior view of a modular heating unit according to one example.

FIG. 7 illustrates an exterior view of a modular heating unit 700 according to one example. As illustrated in FIG. 7, the modular heating unit 700 includes an outlet manifold 702 having an outlet manifold lid 706 with a fastening device 707 and an outlet 708. The modular heating unit 700 further includes an inlet manifold 710 having an inlet 714. Additionally, the modular heating unit 700 includes one or more of the heating systems 50. A bottom manifold 716 is also provided as part of the modular heating unit 700.

The inlet manifold 710 provides an entryway for liquids to enter the modular heating unit 700 via the inlet 714. It should be noted that in selected embodiments, the modular heating unit 700 may contain more than one inlet 714. Liquids may be received from any source via an inlet tube (not shown) connected to the inlet 714.

The outlet manifold 702 provides an exit for liquids to leave the modular heating unit 700 via the outlet 708. In selected embodiments and as with the inlet 714, the modular heating unit 700 may contain more than one outlet 708. Liquids exiting the outlet 708 may be transmitted to any destination, such as a shower or sink, via an outlet tube (not shown) connected to the outlet 708. The outlet manifold 702 further includes an outlet manifold lid 706 to contain liquids within the outlet manifold 702 before they are transmitted externally via the outlet 708. The outlet manifold lid 706 is attached to the outlet manifold 702 via the fastening device 707. Alternatively, or in addition to, additional fastening devices may be radially provided around the inlet manifold 710 and outlet manifold 702.

The heating systems 50 extend between the outlet manifold 702 and the bottom manifold 716 via the inlet manifold 710. The term heating systems 50 is used herein to represent one or more heating systems 50. In selected embodiments, the one or more heating systems may be the heating systems 50 described previously herein whereas in other embodiments other types of heating systems may be utilized. Further, a combination of the heating systems 50 and other heating systems may be employed in the modular heating unit 700. Advantageously, any number of heating systems 50 may be employed in the modular heating unit 700 based on the user needs, water flow and temperature requirements.

Figure 8:
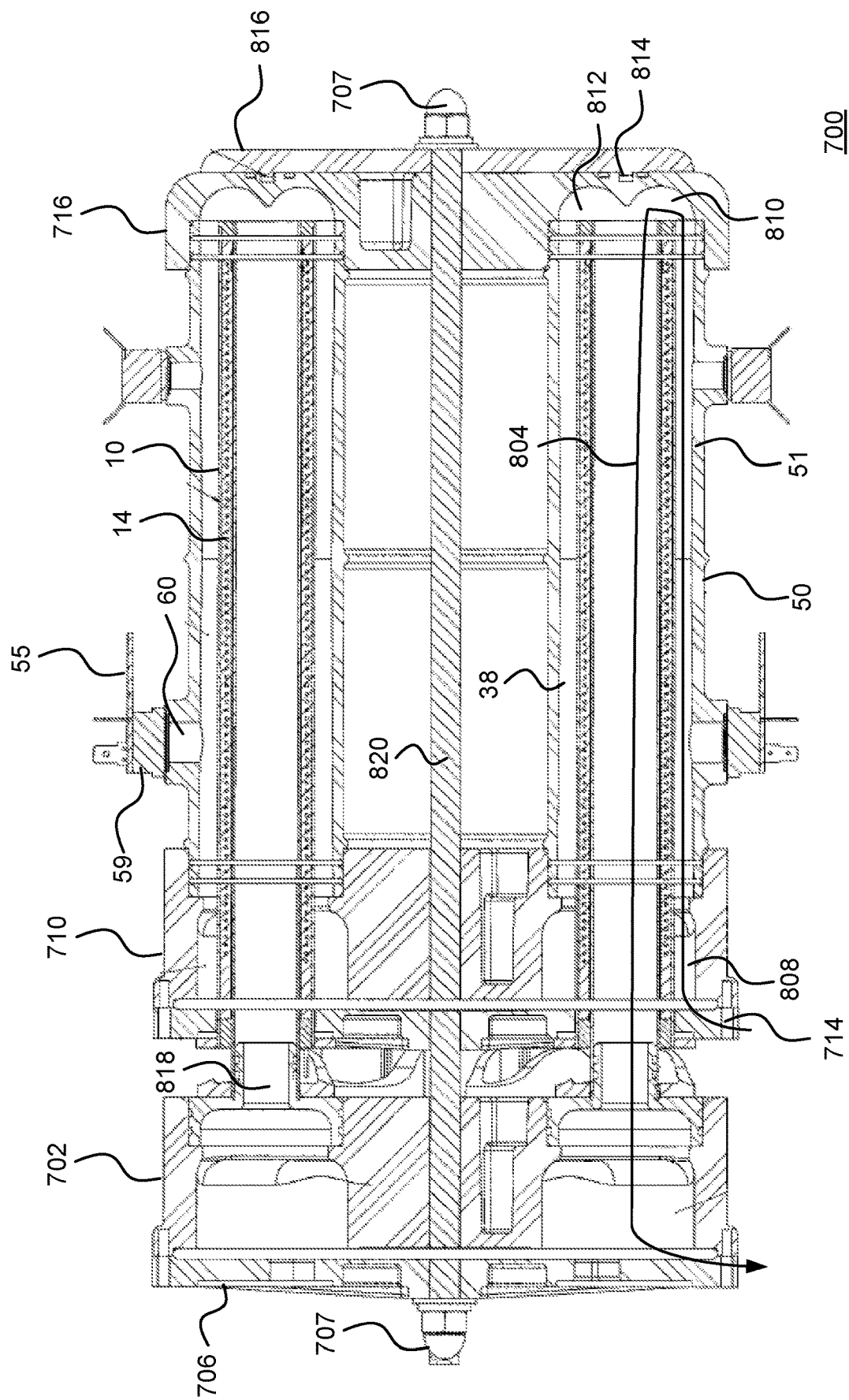
FIG. 8 is a cross-sectional view of the modular heating unit according to one example.

FIG. 8 is a cross-sectional view of the modular heating unit 700 according to one example. As illustrated in FIG. 8, two heating systems 50 are visible in the cross-sectional view. Each heating system 50 includes a tube 10, heating element 14, heating chamber 51, optical assembly 55, connection port 59 and opening 60. A flow channel 38 is provided between the tube 10 and the heating chamber 51 through which liquids may flow. Further, a flow path 804 illustrates a flow path for liquids entering the modular heating unit 700 and exiting the modular heating unit 700. While the flow path illustrated is a laminar flow path, the flow path may also be helical or cyclonic with respect to the annulus of the heating system 50 between the heating chamber 51 and tube 10 as described further herein. This advantageously provides better mixing within the heating system 50.

The flow path 804 illustrates a flow path from the entry of liquids via the inlet 714 of the inlet manifold 710, the flow channel 38 of the heating systems 50, the bottom manifold 716, an interior of the tube 10, a throughway passage 818 and the outlet 708 of the outlet manifold 702. More specifically, liquids enter via the inlet 714 into the interior of the inlet manifold 710 and then enter the flow channel 38 via an opening 808 in the inlet manifold 710 connected to the space between the tube 10 and the heating chamber 51. The opening 808 is a space between an opening of the inlet manifold 710 which receives the tube 10 and the tube 10 itself. Liquid then flows down the flow channel 38 and into the bottom manifold 716.

The bottom manifold 716 contains a plurality of openings 810 to receive the heating systems 50 and liquids flowing in the flow channel 38. As illustrated in FIG. 8, the openings 810 terminate with at least two parabolic curvatures 812 to direct the flow of liquids along the flow path 804 and into the interior of the tube 10. While two parabolic curvatures 812 are illustrated in FIG. 8, it is understood that additional parabolic curvatures could be molded into the bottom manifold 716 based on various flow characteristic requirements. The bottom manifold 716 further contains one or more throughholes 814 which allow liquid to enter a track or channel 902 (illustrated in FIG. 9) between the bottom manifold 716 and a pressure balancing cover 816. The channel 902 is shared channel between the heating systems 50 which allows the channel 902 to fill up with liquid thereby removing air pockets or dead air from the flow path 804. Alternatively or in addition to, a relief valve could be connected to the shared channel to allow air to be released from the modular heating unit 700.

Based on liquid pressure and the parabolic curvatures 812, liquids continue along the flow path 804 into the interior of the tube 10 and back up the length of the heating system 50. Liquids are then passed into a chamber of the outlet manifold 702 via a throughway passage 818. The heated liquid is then transmitted out of the modular heating unit 700 via the outlet 708 of the outlet manifold 702. As described previously herein with respect to the heating system 50, the flow path 804 of the modular heating unit 700 may be reversed.

In selected embodiments, one or more temperature sensors may be incorporated into the outlet manifold 702, or in the outlet 708, to measure the temperature of liquids exiting the outlet manifold 702 via the outlet 708. One or more flow sensors may also be incorporated into the outlet manifold 702, or in the outlet 708, to measure the flow of liquids exiting the outlet manifold via the outlet 708. In selected embodiments, one or more flow sensors may also be incorporated into the inlet manifold 710, or in the inlet 714, to measure the flow of liquids entering the modular heating unit 700. Therefore, the flow of liquids may be measured at the outlet 708 or based on the difference of pressure between the inlet 714 and outlet 708 of the modular heating unit 700. Alternatively, or in addition to, the flow may be measured by the difference in temperature between the inlet 714 and outlet 708 of the modular heating unit 700 after it has received a signal from a flow switch. These measurements are performed by a control device described further with respect to FIG. 15.

FIG. 8 further illustrates the interconnectivity between the elements of the modular heating unit 700. Specifically, the modular heating unit 700 includes a trunnion 820 connecting the outlet manifold 702, inlet manifold 710 and bottom manifold 716. The trunnion 820 runs through a centerline of the modular heating unit 700 and is fastened to the modular heating unit 700 via fastening devices 707. The trunnion 820 enables the modular heating unit 700 to be easily assembled and to easily interconnect the elements of the modular heating unit 700. Further, it provides for easy reconfiguration of the modular heating unit 700 by adding, removing or replacing heating systems 50. As such, in selected embodiments, the fastening device 707 attached to the bottom manifold 716 may be removed thereby allowing the bottom manifold 716 to be detached. Once the bottom manifold 716 is detached the heating systems 50 of the modular heating unit 700 may easily be added, removed or replaced. Once the reconfiguration is completed, the bottom manifold only need be replaced and fastened via the fastening device 707.

Figure 9A:
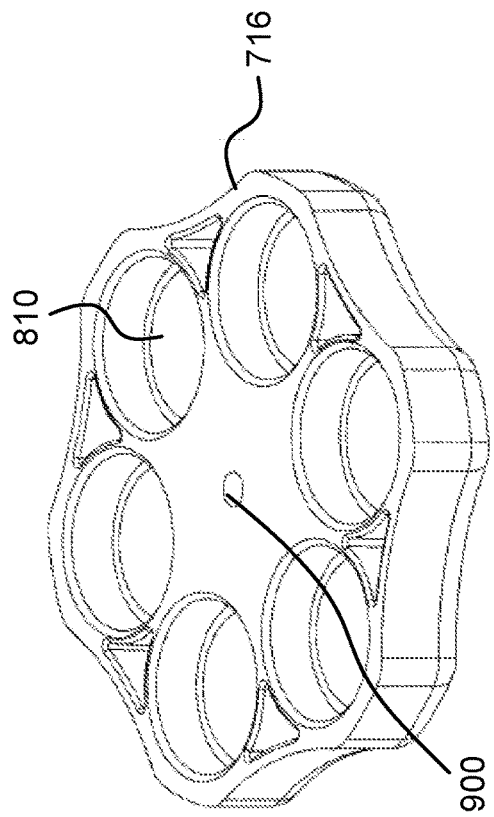
FIG. 9A illustrates one side of a bottom manifold according to one example.
Figure 9B:
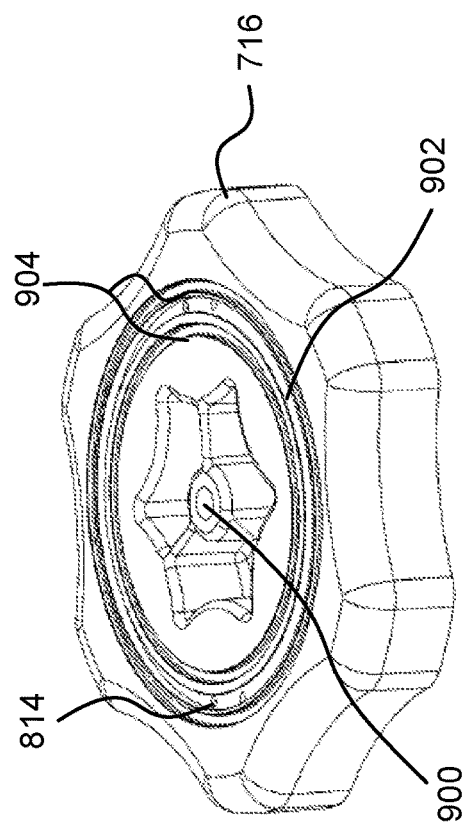
FIG. 9B illustrates another side of the bottom manifold according to one example.

FIGS. 9A and 9B are views of the bottom manifold 716 according to one example. FIG. 9A illustrates one side of the bottom manifold 716 and FIG. 9B illustrates another side of the bottom manifold 716. FIG. 9A illustrates the openings 810 of the bottom manifold 716 which receive the heating systems 50. In selected embodiments, the heating systems 50 may be connected to the bottom manifold 716 via a flange 53 of the heating chamber 51. In other selected embodiments, the heating systems 50 may be connected to the openings 810 of the bottom manifold 716 by being molded as one piece or as separate pieces molded together. FIG. 9A further illustrates an opening 900 which receives the trunnion 820 and enables the trunnion 820 to pass through the bottom manifold 716 to be fastened by fastening device 707. FIG. 9B illustrates the bottom portion of the bottom manifold 716 and similarly includes the opening 900. FIG. 9B further illustrates the throughholes 814 of the bottom manifold 716 that allow liquids to enter the channel 902 in which air pockets may be removed as described previously herein. One or more additional tracks 904 may be provided to accept one or more o-rings to fully enclose the shared track having throughholes.

Figure 10:
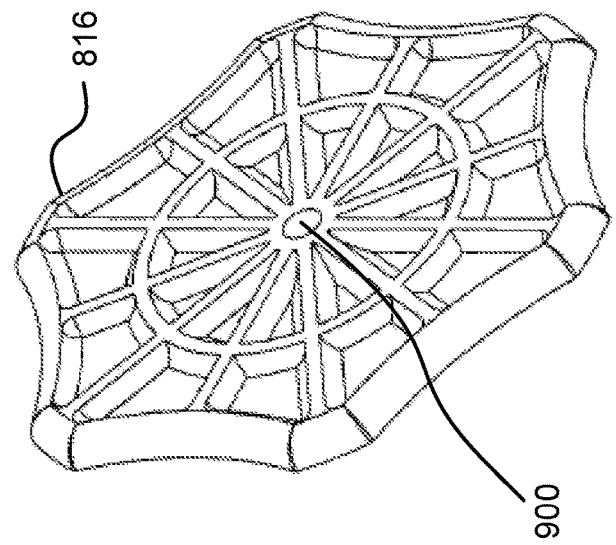
FIG. 10 is a view of a pressure balancing cover according to one example.

FIG. 10 is a view of the pressure balancing cover 816 according to one example. The pressure balancing cover 816 includes the opening 900 which allows the trunnion 820 to pass therebetween such that it can be fastened by fastening device 707. Further, as described previously herein, the pressure balancing cover 816 connects to the bottom side of the bottom manifold 716 having the channel 902. As such, in addition to the additional tracks 904, the pressure balancing cover 816 acts to fully enclose the shared channel 902.

Figure 11B:
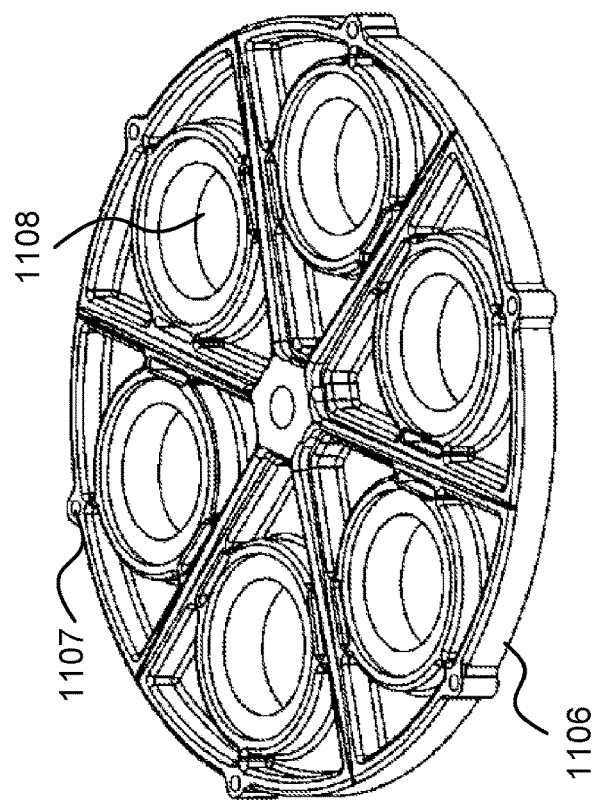
FIG. 11B illustrates an inlet manifold lid according to one example.
Figure 11A:
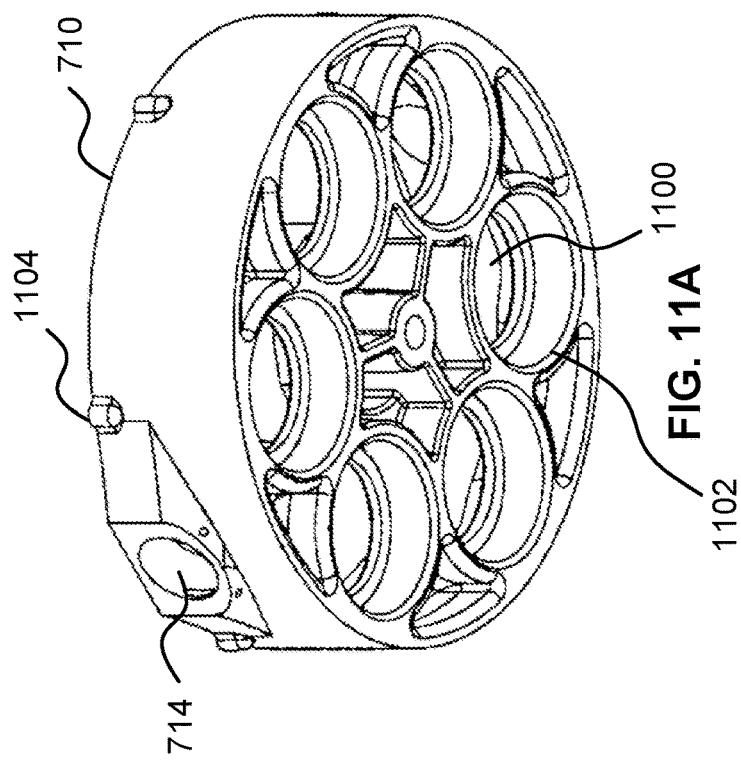
FIG. 11A illustrates an inlet manifold according to one example.

FIG. 11A illustrates the inlet manifold 710 according to one example. As illustrated in FIG. 11A, the inlet manifold contains at least one inlet 714 and in selected embodiments may include one or more additional inlets 714. The inlet manifold 714 also contains a plurality of openings 1100 for receiving the heating systems 50. In selected embodiments, the heating systems 50 are connected such that the heating chamber 51 connects to a bottom portion 1102 of the inlet manifold 710 whereas the inner tube 10 extends through the inlet manifold 710 and into the outlet manifold 702. As such, a space exists between the opening 1100 and the inner tube 10 thereby allowing liquids from the inlet 714 to pass into the heating system 50 via flow path 804. In other embodiments, the flange 52 of the heating chamber 51 fastens to the opening 1100 of the inlet manifold 710 but still leaves a space between the opening 1100 and the inner tube 10. In other selected embodiments, the heating system 50 could be molded as one piece with the inlet manifold 710 or two separate pieces molded together. FIG. 11B illustrates an inlet manifold lid 1106 having openings 1108 according to one example. The inlet manifold 710 and inlet manifold lid 1106 may also contain one or more fastening points 1104 and 1107, respectively, provided radially for fastening the inlet manifold 710 to the inlet manifold lid 1106 having openings 1108 corresponding to the openings 1100 of the inlet manifold 714. The openings 1108 of the inlet manifold lid 1106 act to receive and seal the flanges 52 of respective heating system 50.

Figure 12:
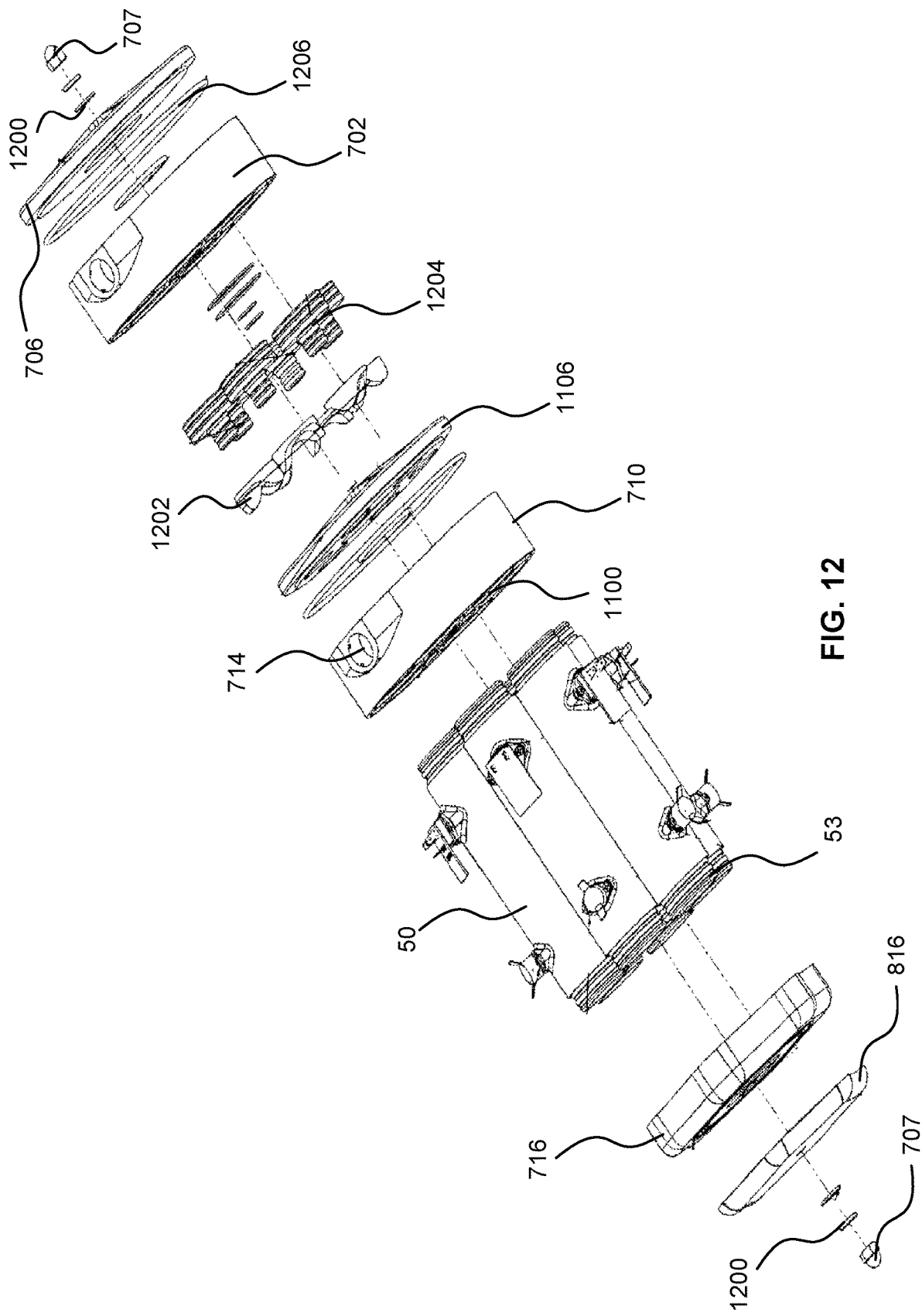
FIG. 12 is an exploded view of the modular heating unit according to one example.

FIG. 12 illustrates an exploded view of the modular heating unit 700 according to one example. In FIG. 12 and in selected embodiments, the trunnion 820 (not shown) extends from the pressure balancing cover 816 to the outlet manifold lid 706 and is held in place via fastening devices 707. Fastening devices 707 are attached to the pressure balancing cover 816 and outlet manifold lid 706, respectively, via washers 1200. However, other fastening devices may be used as would be understood by one of ordinary skill in the art. The pressure balancing cover 816 is connected to the bottom manifold 716 via the trunnion 820. The bottom manifold 716 is connected to one side of the heating systems 50 via flanges 53 of respective heating chambers 51 within respective openings 810 of the bottom manifold 716. The other side of the heating systems 50 are each connected to respective openings 1100 of the inlet manifold via flanges 52 of the heating chambers 51. As noted previously, liquids are received via inlet 714 of the inlet manifold 710. The inlet manifold 710 is connected to the inlet manifold lid 1106 which is in turn connected to a plurality of retainer rings 1202 each corresponding to respective openings 1108 of the inlet manifold lid 1106 and openings 1100 of the inlet manifold 710. The retainer rings 1202 are connected to one or more respective adaptor bosses 1204 which in turn are connected to the outlet manifold 702. The outlet manifold 710 is connected to the outlet manifold lid 706 via one or more o-rings 1206. The fastening device 707 is connected to the trunnion 820 via one or more washers 1200 to hold the modular heating unit 700 together as one unit. Although not illustrated in FIG. 12 but as further illustrated in FIGS. 8 and 13, the tubes 10 of the heating systems 50 extend from the bottom manifold 716 to the outlet manifold 702 via the inlet manifold 710.

FIG. 12 illustrates the advantageous design of the modular heating unit 700 by highlighting the ease at which the modular heating unit 700 can be assembled. Further, in selected embodiments, the outlet manifold 702 and inlet manifold 710 are designed as the same piece to reduce overall manufacturing costs. As illustrated, one or more of the heating systems 50 can easily be removed, replaced or added by removing the fastening device 707 from the trunnion 820 thereby allowing other elements of the modular heating unit 700 to be removed.

Figure 13:
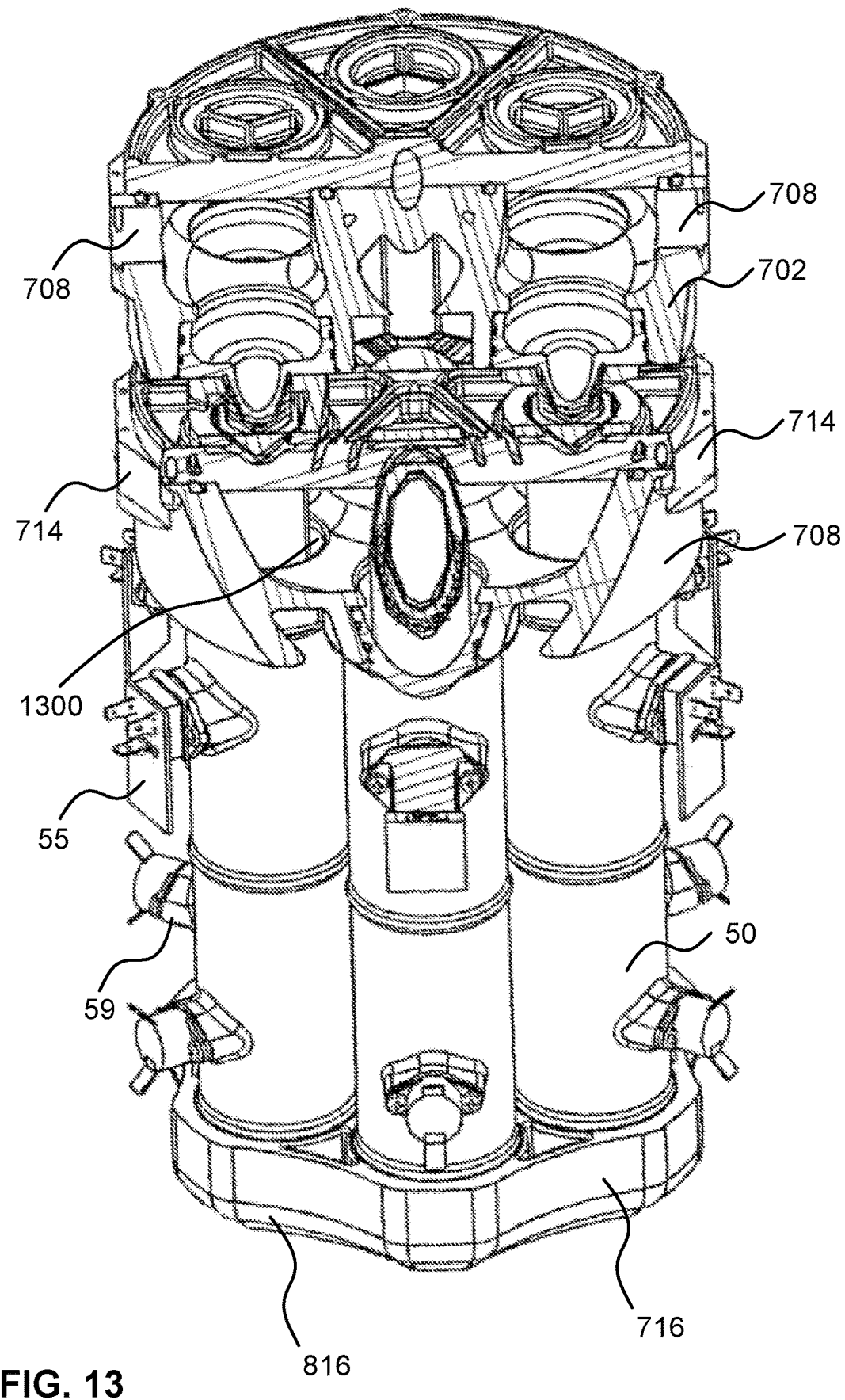
FIG. 13 is a cut-away view of the modular heating unit according to one example.

FIG. 13 illustrates a cut-away view of the modular heating unit according to one example. In FIG. 13, it can be seen that the outlet manifold 702 contains two outlets [706] 708 and the inlet manifold 710 contains two inlets 714. Optical assemblies 55 and openings of the heating systems 50 are illustrated as well as the bottom manifold 708 and the pressure balancing cover 816. The inlet manifold 710 is designed and used to evenly disperse an incoming flow of liquid from inlets 714 into the one or more heating systems 50 connected to the inlet manifold 710. When any opening 1100 of the inlet manifold 710 is not receiving a heating system 50, the opening 1100 is blocked to ensure that liquid does not enter this opening 1100. The inlets 714 of the inlet manifold 710 (as illustrated in FIG. 11A) are positioned to be offset from a centerline of the inlet manifold 710 such that the inlets 714 are not directly over the openings 1100 and a cyclonic flow distribution is created as incoming liquids are fed into the one or more heating systems 50. Accordingly, liquids entering the heating systems 50 will flow in a cyclonic fashion down the flow channel 38 and up the interior of the tubes 10 via the flow path 804. This advantageously optimizes heat transfer between the electrical resistance heating elements 14 and liquid and minimizes issues arising from pressure drops within heating chambers 51. As illustrated in FIG. 13 and with reference to FIG. 8, the flow path 804 begins at the entry of the inlets 714, into the inlet manifold 710 and into an open space 1300 between the openings 1100 of the inlet manifold and the tube 10 of the heating system 50. The liquid then enters the flow channel 38 as described previously herein.

Figure 14:
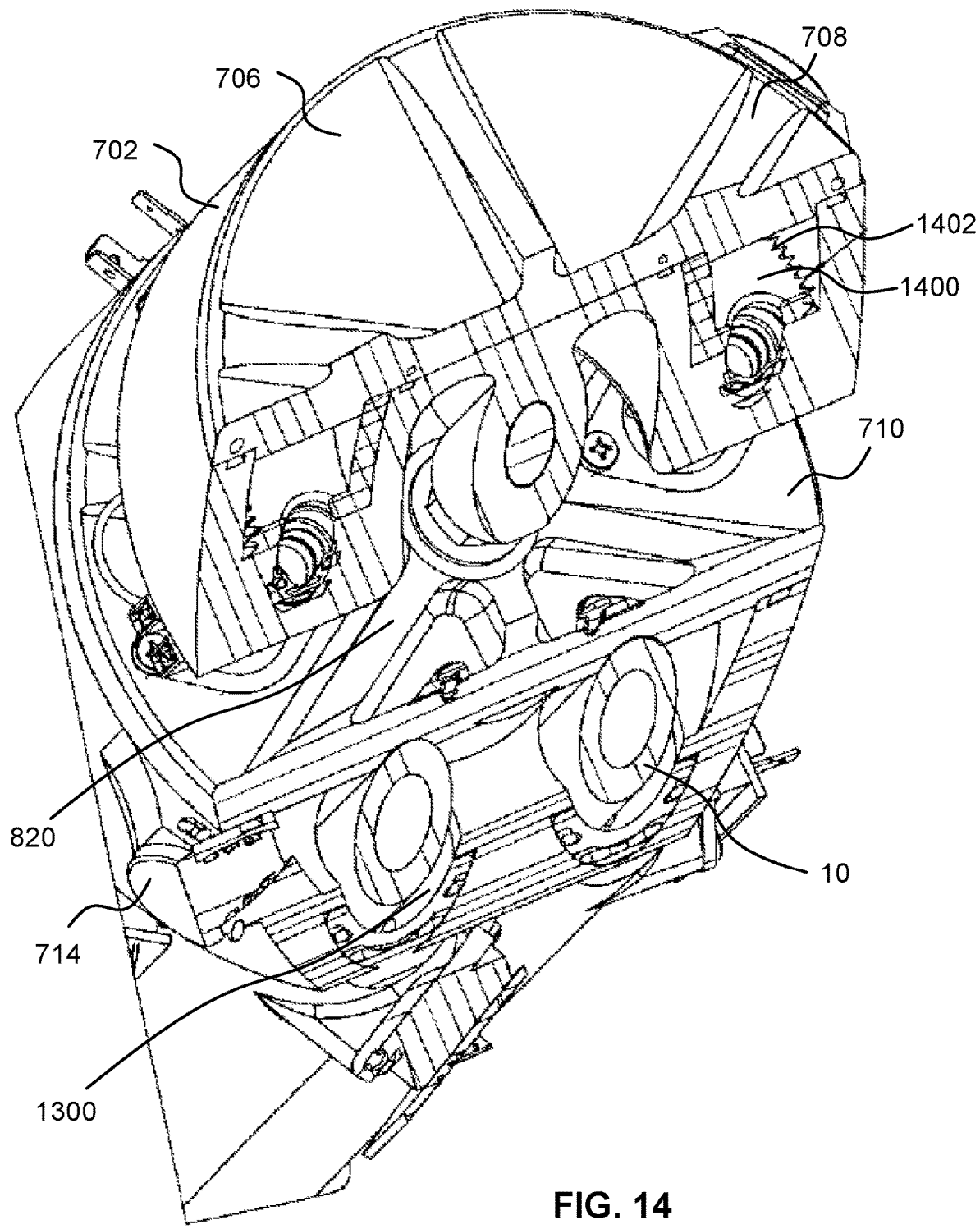
FIG. 14 is a cut-away view of the modular heating unit according to one example.

FIG. 14 is a cut-away view of the modular heating unit 700 according to one example. As in FIG. 13, FIG. 14 illustrates the inlet manifold 710 and the outlet manifold 702 as well as the inlet 714 and outlet 708. The tubes 10 of the heating systems 50 are also illustrated as well as the space 1300 between the openings 1100 of the inlet manifold 710 and the tubes 10 of the heating systems 50 which allows for liquids entering the inlet 714 to follow the flow path 804 from the inlet manifold 710 and into the heating systems 50. FIG. 14 also illustrates a flow modulation device 1400 for controlling and/or restricting the rate at which heated liquids are output from the outlet manifold 702 via the outlet 708. The flow modulation device 1400 restricts water by blocking a portion of respective openings of the outlet manifold 702 that receive heated liquid from the heating systems 50 via the inlet manifold 10.

The flow modulation device 1400 advantageously allows the modular heating unit 700 to correct and modulate the flow of liquids based on a desired temperature and the heating capacity of the modular heating unit 700. For instance, if the flow rate of liquids exiting the outlet manifold 702 via the outlet 708 is too high for the heating system 50 to effectively heat, the flow rate may be restricted via the flow modulation device 1400 to enable the liquid to be heated to the required temperature. In selected embodiments, the flow modulation device 1400 is a gear that is actuated by pinion or electromagnetically via one or more solenoids. Therefore, each opening of the outlet manifold 702 is simultaneously restricted the same amount based on the movement of the gear via gear teeth 1402 to cover a portion of each opening. However, in selected embodiments, the flow modulation device 1400 may include separately controlled gears such that some openings of the outlet manifold 702 may be restricted while at the same time other openings of the outlet manifold 702 may be fully restricted or not restricted at all.

Figure 15:
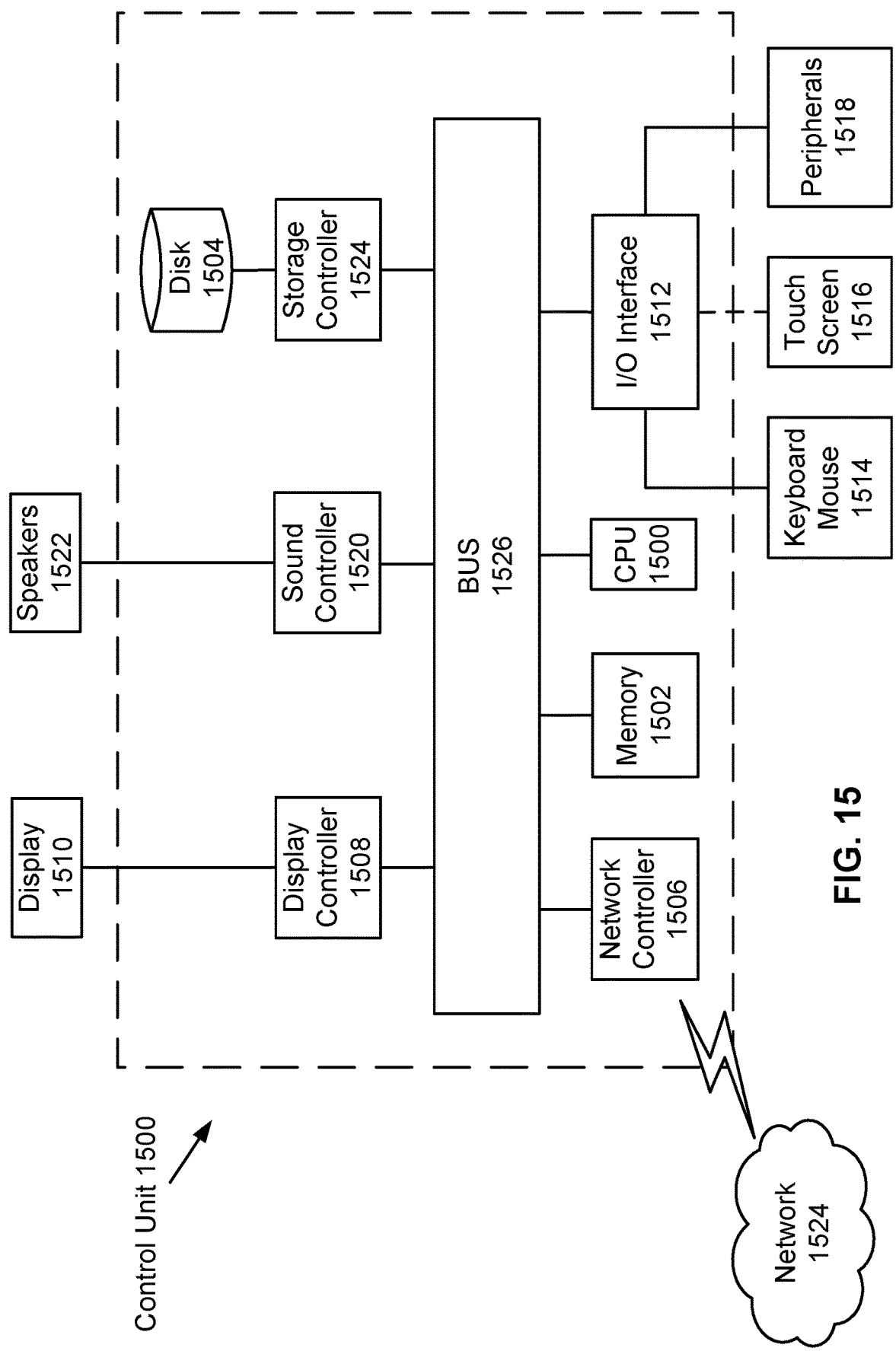
FIG. 15 is a diagram of a control unit according to one example.

FIG. 15 is a diagram of a control unit 1500, or control device, according to one example. A hardware description of the control unit 1500 is herein provided according to exemplary embodiments as described with reference to FIG. 15. The control unit 1500 may be located on or in the modular heating unit 700 or remotely from the modular heating unit 700. In FIG. 15, the control unit 1500 includes a CPU 1500 which performs control over processes of the modular heating unit 700 such as measuring (via the flow and temperature sensors) and controlling flow and temperature of the heating liquids and heating systems 50. The process data and instructions may be stored in memory 1502. These processes and instructions may also be stored on a storage medium disk 1504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the control unit 1500 communicates, such as a server or computer.

Further, the processes may be provided as a utility application, background daemon, or component of an operating system, or combination thereof, executing in conjunction with CPU 1500 and an operating system such as Microsoft Windows 7, UNIX, Solaris, LINUX, and other systems known to those skilled in the art or a custom built operating system.

CPU 1500 may be a Xenon or Core processor from Intel of America, an Opteron processor from AMD of America or an Atmel chip manufactured by Atmel Corporation, or may be other processor types that would be recognized by one of ordinary skill in the art. Alternatively, the CPU 1500 may be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

The control unit 1500 in FIG. 15 also includes a network controller 1506, such as an Intel Ethernet PRO network interface card from Intel Corporation of America, for interfacing with network 1524. As can be appreciated, the network 1500 can be a public network, such as the Internet, or a private network such as an LAN or WAN network, or any combination thereof and can also include PSTN or ISDN sub-networks. The network 1524 can also be wired, such as an Ethernet network, or can be wireless such as a cellular network including EDGE, 3G and 4G wireless cellular systems. The wireless network can also be WiFi, Bluetooth, or any other wireless form of communication that is known.

The control unit 1500 may further include a display controller 1508, such as a NVIDIA GeForce GTX or Quadro graphics adaptor from NVIDIA Corporation of America for interfacing with display 1510, such as a Hewlett Packard HPL2445w LCD monitor. The display 1510 may also be a small LCD screen located on the modular heating unit 700 itself. The display 1510 may provide information allowing a user to interact, via CPU 1500 to provide settings to the modular heating unit 700. For example, the display 1510 may allow a user to set a temperature, change metric units, flow rate, software version, error codes or error messages and identify a load power percentage. Upon setting a temperature, the control unit 1500 will command power to be applied to the electrical resistance heating elements 14 until an appropriate temperature of liquids is determined between the temperature sensors and flow sensors. Error messages may include event and fault codes that are communicated until they are resolved. These include as non-limiting examples a thermistor out of range, no change in temperature detected, leak detected, excessive or minimal flow detected, inlet temperature too hot to generate heat or communication issues. A general purpose I/O interface 1512 may interface with a keyboard and/or mouse 1514 as well as a touch screen panel 516 on or separate from display 1510. General purpose I/O interface may also connect to a plurality of lights that may be illuminated based on predetermined conditions identified within the modular heating unit 700 by the control unit 1500. The general purpose I/O interface 1512 may also be used to enable or disable the display as well as to lock the display by entering a predetermined code, setting or holding a button for a predetermined period of time.

A sound controller 1520 may also be provided in the control unit 1500, such as Sound Blaster X-Fi Titanium from Creative, to interface with speakers/microphone 1522 thereby providing sounds and/or music. The control unit 1500 may also emit certain codes or sound patterns, corresponding to the error messages, based on the identification of the predetermined conditions to alert a user to an issue or concern with respect to the modular heating unit 700.

The general purpose storage controller 1524 connects the storage medium disk 1504 with communication bus 1526, which may be an ISA, EISA, VESA, PCI, or similar, for interconnecting all of the components of the control unit 1500. A description of the general features and functionality of the display 1510, keyboard and/or mouse 1514, as well as the display controller 1508, storage controller 1524, network controller 506, sound controller 1520, and general purpose I/O interface 512 is omitted herein for brevity as these features are known.

As noted herein, the control unit 1500 measures values from one or more sensors such as flow sensors and temperature sensors and based on those measurements controls the feedback or movement of the flow modulation device 1300 to appropriately restrict or enlarge the openings of the outlet manifold 702. These measurements may be received locally by the control unit 1500 or wirelessly via the network 1524. The control unit 1500 may also provide control commands to the modular heating unit wirelessly via network 1524.

Figure 16:
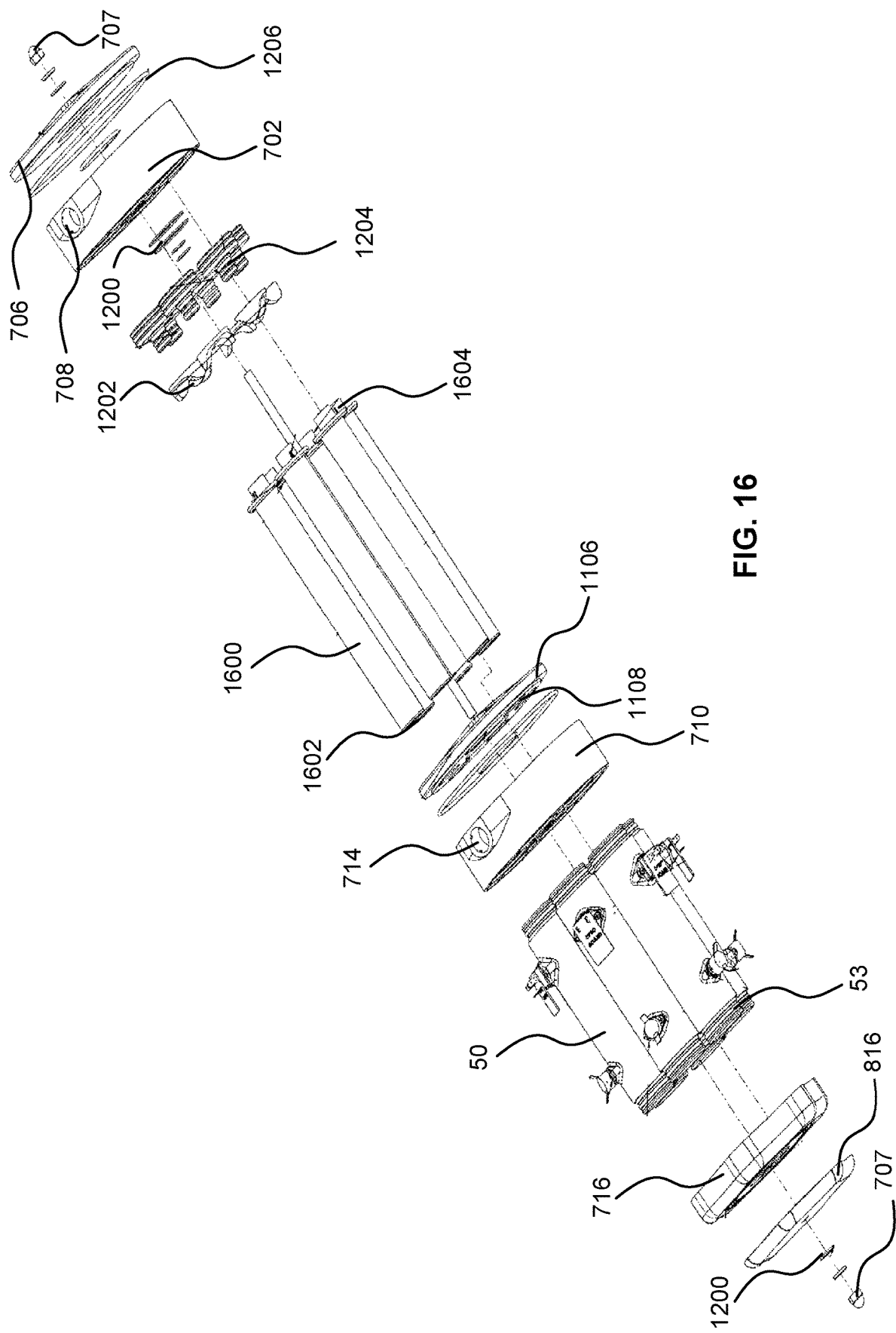
FIG. 16 is an exploded view of the modular heating unit according to one example.

FIG. 16 is an exploded view of the modular heating unit 700 according to one example. In this embodiment, the modular heating unit 700 includes additional heating systems 1600 for heating liquids entering the modular heating unit 700. As illustrated in FIG. 16, openings 1108 of the inlet manifold lid 1106 of the inlet manifold 710 are connected respectively to inlets 1602 on one side of the heating systems 1600. The other side of the heating systems 1600 have outlets 1604 that are each respectively connected to the retainer rings 1202. In this embodiments, additional heating is provided to liquids entering the modular heating unit 700 such that heated liquids exiting the inlet manifold 710 via the inlet manifold lid 1106 are transmitted into inlets 1602 of the additional heating systems 1600 which further heat the liquid passing therebetween. The heated liquids are then transmitted out of the additional heating systems 1600 via outlet 1604 and to the outlet manifold 710. The heating systems 1600, in selected embodiments, are each made up of a hollow interior tube and exterior tube with a heating element compacted therebetween to heat liquids passing through the interior tube.

While two types of heating systems 50/1600 are illustrated in FIG. 16, additional heating systems may be used or the heating systems 50/1600 may be intermixed. Further, the same type of heating systems may be used within the modular heating unit in series to provide additional heating capacity. Accordingly, in selected embodiments, the modular heating unit 700 may contain a variety of heating systems 50/1600 configurations to provide additional heating capacity based on customer needs. Further, some heating systems may be more expensive to manufacture than others thereby providing an easily configurable modular heating unit 700 based on manufacturing costs and customer client requirements.

Further, although not illustrated, one modular heating unit 700 may be connected to one or more other modular heating units 700 to provide additional heating capacity based on customer need. As such, in selected embodiments, the outlet 708 of one modular heating unit 700 may be connected to the inlet of 714 of another modular heating unit 700 and so forth. Therefore, for example, customers having large flow and variable temperature requirements can chain as many modular heating units 700 together as required to meet their flow and temperature needs.

Another advantage provided by the modular heating unit 700 is the compact design. Due to the parallel placement of the heating systems and the compact placement of the inlet manifold, outlet manifold and bottom manifold, the modular heating unit 700 can be placed in small locations as may be required for some customers.

The components of the modular heating unit described above can be manufactured, in selected embodiments, via injection molding or machining as would be understood by one of ordinary skill in the art. Therefore, the components may be molded into any shape or made from any material, such as thermoplastic or thermosetting polymers, as would be understood by one of ordinary skill in the art. Accordingly, common polymers such as epoxy, phenolic, nylon, polyethylene or polystyrene may be utilized. This material is fed into a heated barrel, mixed and forced into a mold cavity (formed of a material such as steel or aluminum and machined to a form that features the desired part) where it cools and hardens to the configuration of the cavity. Exemplary molding machines that may be utilized for such a process include a Ferromatik Milacron injection molding machine or those built by Arburg.

The components of the modular heating unit 700 described above may be also be precision machined manually or automatically by computer numerical control (CNC) as would be understood by one of ordinary skill in the art. Accordingly, the components can be formed of metal, such as steel or aluminum, and formed via a combination of turning, drilling, milling, shaping, planning, boring, broaching and sawing.

Obviously, numerous modifications and variations of the present advancements are possible in light of the above teachings. It is therefore to be understood that within the scope of the appended claims, the present advancements may be practiced otherwise than as specifically described herein.

The invention claimed is:
1. A heating unit comprising:
a first manifold having at least one outlet, wherein the first manifold is an upper manifold;
a second manifold separate and distinct from the first manifold, the second manifold fluidly connected to the first manifold and having at least one inlet, wherein the second manifold is a middle manifold;
a third manifold separate and distinct from the first manifold and the second manifold, wherein the third manifold is a lower manifold and the third manifold is fluidly connected to the first manifold and the second manifold, wherein the first manifold, the second manifold, and the third manifold are arranged with the second manifold disposed between the first manifold and the third manifold, to form a flow path such that fluid is configured to enter the heating unit via the inlet of the second manifold and exit the heating unit via the outlet of the first manifold by sequentially flowing through the second manifold, the third manifold, and the first manifold; and
a heating system that extends from the third manifold to the second manifold by passing through the first manifold, the heating system having an inner tube and an outer tube disposed in a concentric arrangement;
wherein the heating system comprises an electrical resistance heating element connected to the inner tube, the electrical resistance heating element disposed within the outer tube and along an outer surface of the inner tube such that the fluid is heated as the fluid flows in both the first direction over the electrical resistance heating element and the second direction through the interior of the inner tube; and
wherein the electrical resistance heating element is electrically coupled to a termination connector that is disposed adjacent to an upper end of the heating unit, and wherein current flows through the termination connector to the electrical resistance heating element.

2. The heating unit according to claim 1, wherein the gap extends along a length of the inner tube and the outer tube.

3. The heating unit according to claim 2, the flow path extending from the inlet of the second manifold, to an interior of the inner tube in the first manifold, to the gap formed between the inner tube and the outer tube, and to the outlet of the first manifold.

4. The heating unit according to claim 1, the flow path extending from the inlet of the second manifold, to an interior of the inner tube in the first manifold, to an area between the inner tube and the outer tube, and to the outlet of the first manifold.

5. The heating unit according to claim 4, wherein the third manifold includes a plurality of openings to receive the heating system, each opening terminating in at least two parabolic curvatures to direct the flow path from the interior of the inner tube to the area between the inner tube and the outer tube.

6. The heating unit according to claim 5, wherein the third manifold includes a pressure equalizing track to remove air pockets from liquid in the flow path.

7. The heating unit according to claim 1, wherein the heating system is detachable from the heating unit.

8. The heating unit according to claim 1, wherein the first manifold and the third manifold are attached via a trunnion extending therebetween, wherein the trunnion extends through a center of the first manifold and the third manifold.

9. The heating unit according to claim 8, wherein the second manifold is attached to the first and third manifolds via the trunnion, and wherein the heating unit further comprises a first fastener disposed at a first end of the trunnion, and a second fastener disposed at a second end of the trunnion.

10. The heating unit according to claim 1, wherein the at least one inlet is offset from a centerline of the second manifold to generate cyclonic flow distribution for liquid entering the heating unit.

11. The heating unit according to claim 1, wherein the first manifold includes a flow modulation device to restrict the flow path.

12. The heating unit according to claim 1, wherein the heating system extends into the second manifold.

13. The heating unit according to claim 1, wherein the at least one inlet and at least one outlet are spaced apart along a longitudinal axis of the heating unit.

14. A multi-stage heating system comprising:
at least two heating units according to claim 1,
wherein the at least two heating units are connected to each other such that the outlet of one heating unit is connected to the inlet of another heating unit.

15. A heating unit comprising:
a first manifold having at least one inlet, the first manifold being an upper manifold;
a second manifold separate and distinct from the first manifold, the second manifold fluidly connected to the first manifold and having at least one outlet, the second manifold being a middle manifold;
a third manifold separate and distinct from the first manifold and the second manifold, wherein the third manifold is a lower manifold and is fluidly connected to the first manifold and the second manifold, wherein the first manifold, the second manifold, and the third manifold form a flow path such that fluid is configured to enter the heating unit via the inlet of the first manifold and exit the heating unit via the outlet of the second manifold by sequentially flowing through the first manifold, the third manifold, and the second manifold; and
one or more heating systems each of which extends from the third manifold to the second manifold by passing through the first manifold, the one or more heating systems having an inner tube and an outer tube disposed in a concentric arrangement;
wherein the one or more heating systems comprises an electrical resistance heating element connected to the inner tube, the electrical resistance heating element disposed within the outer tube and along an outer surface of the inner tube such that the fluid is heated as the fluid flows in both a first direction over the electrical resistance heating element and an opposite second direction through an interior of the inner tube;
wherein the electrical resistance heating element is electrically coupled to a termination connector that is disposed adjacent to an upper end of the heating unit, and wherein current flows through the termination connector to the electrical resistance heating element; and
wherein the third manifold includes a plurality of openings to receive the one or more heating systems, each opening terminating in at least two parabolic curvatures to direct the flow path from the interior of the inner tube to the area between the inner tube and the outer tube, such that the fluid is heated as the fluid flows in both the first direction and the second direction.

16. The heating unit according to claim 15, the flow path extending from the first manifold, to an area between the inner tube and the outer tube, to the interior of the inner tube and to the second manifold.

17. The heating unit according to claim 16, the flow path extending from the first manifold, through the gap formed between the inner tube and the outer tube, to the interior of the inner tube and to the second manifold.

* * * * *